United States Patent
Petrie

(10) Patent No.: US 11,074,889 B2
(45) Date of Patent: Jul. 27, 2021

(54) ADAPTIVE COMPRESSION BY LIGHT LEVEL

(71) Applicant: DISPLAYLINK (UK) LIMITED, Cambridge (GB)

(72) Inventor: Richard Jonathan Petrie, Guildford (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/614,784

(22) PCT Filed: May 18, 2018

(86) PCT No.: PCT/GB2018/051348
§ 371 (c)(1),
(2) Date: Nov. 18, 2019

(87) PCT Pub. No.: WO2018/211287
PCT Pub. Date: Nov. 22, 2018

(65) Prior Publication Data
US 2020/0082791 A1   Mar. 12, 2020

(30) Foreign Application Priority Data

May 19, 2017 (GB) ..................................... 1708060

(51) Int. Cl.
*G09G 5/10* (2006.01)
*G02B 27/01* (2006.01)
*G06F 3/01* (2006.01)
(52) U.S. Cl.
CPC ............. *G09G 5/10* (2013.01); *G02B 27/017* (2013.01); *G06F 3/013* (2013.01);
(Continued)

(58) Field of Classification Search
CPC ......... G09G 2360/16; G09G 2360/144; G09G 2320/0666; G09G 2320/0233;
(Continued)

(56) References Cited

U.S. PATENT DOCUMENTS 6,075,523 A * 6/2000 Simmers ................ G09G 5/363
345/555
6,900,778 B1 * 5/2005 Yamamoto ......... G02B 27/0093
345/8
(Continued)

FOREIGN PATENT DOCUMENTS

GB         2535482       2/2015
WO    WO 2011/159617    12/2011

*Primary Examiner* — Dong Hui Liang
(74) *Attorney, Agent, or Firm* — Haynes and Boone, LLP

(57) ABSTRACT

A method for adapting display data forming an image for display on a display screen to a viewer involves monitoring, over time, light that may affect an eye of the viewer of the image, analysing (S82) information regarding the monitored light based on one or more predetermined parameters (which may be based on a predetermined model of reactions of a human eye to light or to changes in light), adjusting (S83) at least one display value (preferably not a luminance value) of at least some of the display data based on the analysis of the monitored light, compressing the adjusted display data, and sending (S84) it for display on the display screen. In one embodiment, the one or more predetermined parameters includes one or more colour thresholds and monitoring the light comprises monitoring relative levels of different colours in the monitored light.

17 Claims, 21 Drawing Sheets

(52) U.S. Cl.
CPC ............... *G09G 2320/0626* (2013.01); *G09G 2320/0666* (2013.01); *G09G 2340/0428* (2013.01); *G09G 2340/0435* (2013.01); *G09G 2360/144* (2013.01)

(58) Field of Classification Search
CPC ..... G09G 2320/066; G09G 2320/0271; G09G 2320/0276; G09G 5/02; G09G 3/2003; G09G 2340/0435; G09G 2340/06; G09G 2340/0407; G09G 2310/08; G09G 2354/00; G02B 27/017
See application file for complete search history.

(56) References Cited

U.S. PATENT DOCUMENTS

| | | | | |
|---|---|---|---|---|
| 7,050,492 | B1 * | 5/2006 | Fenne | H04N 11/042 375/240 |
| 2002/0113782 | A1 * | 8/2002 | Verberne | G06F 1/1686 345/204 |
| 2008/0303918 | A1 * | 12/2008 | Keithley | G09G 3/20 348/223.1 |
| 2010/0066750 | A1 | 3/2010 | Yu et al. | |
| 2010/0123651 | A1 * | 5/2010 | Miller | G09G 3/3208 345/77 |
| 2010/0128054 | A1 * | 5/2010 | Manabe | G09G 5/003 345/589 |
| 2012/0062622 | A1 * | 3/2012 | Koyama | G09G 3/3406 345/690 |
| 2013/0187958 | A1 * | 7/2013 | Kimpe | G09G 5/10 345/690 |
| 2013/0194259 | A1 | 8/2013 | Bennett et al. | |
| 2013/0241950 | A1 * | 9/2013 | Mihara | G09G 5/00 345/589 |
| 2016/0148583 | A1 | 5/2016 | Nakanishi et al. | |
| 2017/0039919 | A1 * | 2/2017 | Wu | G09G 5/10 |
| 2018/0033378 | A1 * | 2/2018 | Li | G09G 3/34 |
| 2018/0146121 | A1 * | 5/2018 | Hensler | H04N 1/646 |
| 2018/0336849 | A1 * | 11/2018 | Ishii | G06T 5/008 |
| 2018/0352255 | A1 * | 12/2018 | Hinds | G06T 9/00 |

\* cited by examiner

ADAPTIVE COMPRESSION BY LIGHT LEVEL

CROSS-REFERENCE TO RELATED APPLICATIONS

This application is a U.S. national stage application under 35 U.S.C. § 371 of International Patent Application No. PCT/GB2018/051348, filed on May 18, 2018, which claims the benefit of Great Britain Patent Application No. 1708060.7 filed on May 19, 2017, the contents of each of which are incorporated herein by reference in their entirety.

BACKGROUND

Current development of display technology, especially in virtual reality, aims to match the performance of computer displays to the performance of the human eye. This includes increasing the dynamic range, which gives improved contrast, range of colours, and frame rate. However, as more and more display data is required in more complicated scenarios, and it is desirable to use wireless technology, rather than wires, the amount of data to be sent becomes very large. Although, in some cases, the display data is compressed, before being transmitted, wirelessly or through wires, it would still be desirable to try to minimise the amount of data that actually needs to be sent.

Accordingly, the present invention tries to reduce the amount of display data that needs to be sent for display to try to mitigate the above problems.

SUMMARY

Therefore, in a first aspect, the invention provides a method for adapting display data forming an image for display on a display screen to a viewer, the method comprising:

monitoring, over time, light that may affect an eye of the viewer of the image;

analysing information regarding the monitored light based on one or more predetermined parameters;

adjusting at least one display value of at least some of the display data based on the analysis of the monitored light; and sending it for display on the display screen.

In an embodiment, the method further comprises compressing the adjusted display data prior to sending the adjusted display data for display on the display screen. Preferably, adjusting the at least one display value excludes adjusting a luminance value of the display data. The one or more predetermined parameters are preferably based on a predetermined model of reactions of a human eye to light or changes in light.

Monitoring the light may comprise monitoring light emitted or to be emitted by the display screen when the image is displayed thereon, for example by determining a luminance of the display data being displayed or to be displayed on the display screen, and/or monitoring the light may comprise monitoring ambient light in the vicinity of the viewer.

In a preferred embodiment, analysing the information based on one or more predetermined parameters comprises comparing a level of brightness of the monitored light to one or more brightness thresholds. The one or more thresholds preferably includes a first brightness threshold, and adjusting the at least one display value preferably comprises, when the monitored level of brightness is below the first brightness threshold, performing one or more of:

reducing colour depth of the display data;
reducing a frame rate of the display data;
reducing a luminance depth of the display data by a first amount; and decreasing a resolution of at least a portion of the display data.

In an embodiment, the one or more thresholds includes a second brightness threshold, and adjusting the at least one display value comprises, when the monitored level of brightness of the light is above the second brightness threshold, performing one or more of:

reducing colour depth of the display data;
reducing a frame rate of the display data;
reducing a luminance depth of the display data by a first amount; and
decreasing a resolution of at least a portion of the display data;
for a predetermined period of time after it is determined that the monitored level of brightness has increased to a brightness level above the second brightness threshold.

In another embodiment, the one or more thresholds includes a third brightness threshold, and adjusting the at least one display value comprises, when the monitored level of brightness remains below the third brightness threshold for a first predetermined period of time, performing one or more of:

reducing values of red and/or yellow colour components of the display data;
reducing a frame rate of the display data;
reducing a luminance depth of the display data by a second amount, being higher than the first amount;
decreasing a luminance range of at least a portion of the display data.

Adjusting the at least one display value may optionally comprise reducing values of blue and/or green colour components of the display data when the monitored level of brightness remains below the third brightness threshold for a second predetermined period of time, and/or may comprise removing all colour data of the display data when the monitored level of brightness remains below the third brightness threshold for a third predetermined period of time.

Reducing a luminance depth of at least a portion of the display data may optionally comprise relatively reducing a luminance depth of a portion of the display data forming part of the image compared to a luminance depth of a portion of the display data forming a different part of the image.

In an embodiment, the method may further comprise receiving feedback from an eye tracking sensor as to which part of the image is being focussed on by the viewer, and relatively reducing the luminance depth of the part of the image being focussed on by the viewer and relatively increasing the luminance depth of a different part of the image which is being viewed using peripheral vision of the viewer.

Optionally, the one or more thresholds includes a fourth brightness threshold, and the method further comprises comparing the monitored level of brightness with recent previous levels of brightness and adjusting the at least one display value comprises, when the monitored level of brightness has increased by at least a predetermined amount from the recent previous levels of brightness to a brightness level above the fourth brightness threshold, performing one or more of:

reducing values of red and/or yellow colour of the display data to a reduced amount;

reducing a frame rate of the display data to a reduced frame rate;

reducing a luminance depth of the display data to a reduced luminance depth;

reducing a resolution of at least a portion of the display data to a reduced resolution;

reducing colour depth of the display data;

for a third predetermined period of time.

In this case, adjusting the at least one display value may optionally comprise performing one or more of:

increasing values of red and/or yellow colour components of the display data from the reduced amount;

increasing the frame rate of the display data from the reduced frame rate;

increasing a luminance depth of the display data from the reduced luminance depth;

increasing a resolution of at least a portion of the display data from the reduced resolution;

increasing colour depth of the display data;

when the monitored level of brightness remains above the fourth brightness threshold for a fourth period of time.

Preferably, the one or more predetermined parameters may include one or more colour thresholds and monitoring the light may comprise monitoring relative levels of different colour components in the monitored light. Monitoring the light may further comprise determining a level of red colour component in the monitored light relative to other colour components in the monitored light, and wherein adjusting the at least one display value comprises, when the determined level of red colour component in the monitored light relative to other colour components in the light is above a first red colour threshold, performing one or more of:

reducing values of non-red colour component data of the display data relative to values of red colour component data in the display data;

increasing a frame rate of the display data;

increasing a luminance depth of at least a portion of the display data;

decreasing colour depth of the display data.

Increasing a luminance depth of at least a portion of the display data preferably optionally comprises relatively increasing a luminance depth of a portion of the display data forming part of the image compared to a luminance depth of a portion of the display data forming a different part of the image.

The method my further optionally include receiving feedback from an eye tracking sensor as to which part of the image is being focussed on by the viewer, and relatively decreasing the luminance range of the part of the image being focussed on by the viewer and relatively increasing a different part of the image which is being viewed using peripheral vision of the viewer Monitoring the light may comprise monitoring the light with a photo detector or with a camera.

The display screen may be at an augmented reality device or virtual reality headset.

In a second aspect, the invention provides an apparatus configured to perform method described above.

In a third aspect, the invention provides a system comprising an apparatus as described above and an augmented reality device or virtual reality headset comprising the display screen.

Thus, in an example embodiment, the invention provides a method of taking light adaptation of the photoreceptors in a user's eyes into account when generating and transmitting display data, comprising:

1. Determining recent light level
2. Amending generated display data to produce only the parts of the final display data which are assumed to be visible depending on the determined light level
3. Transmitting the amended display data for display
4. Displaying the amended display data Amending the generated display data may involve removing elements such as colour depth, fast movement, and details requiring high acuity, reducing the volume of data being transmitted across a limited-bandwidth connection.

The light level may be determined from knowledge of the display data being transmitted or having been transmitted, or it may be determined from a light measurement device in the vicinity of the viewer which detects the overall luminance of the displayed display data plus ambient light level and colour balance.

In some embodiments, control of the ambient light level prior to the beginning of transmission of display data may be used in order to acclimatise the user's eyes to a lower light level of the intended display images. Similarly, to improve the viewer's experience, the ambient light could be changed from a more conventional white light to a red light in order to allow the user's eyes to transition to a level of Scotopic vision without removing ambient light entirely. Total darkness could subsequently be used for a shorter period to ensure total dark adaptation. Red light could also be used to enable illumination suitable for Photopic vision while also maintaining some level of Scotopic vision.

This allows elements of the display data to be adjusted so only elements visible to the viewer are transmitted. The adjustments could be made continuously to track the overall luminance of the display image.

The continual adjustment to the display data to match the actual visibility of the images presented to the viewer can be used to reduce the overall data volume transmitted. This in turn reduces the bandwidth demands on the communication path and also save power

BRIEF DESCRIPTION OF THE DRAWINGS

Embodiments of the invention will now be more fully described, by way of example, with reference to the drawings, of which.

DETAILED DESCRIPTION OF THE DRAWINGS

There are two basic types of photoreceptors in the human eye: rods and cones. The cones are mostly active in normal lighting, such as daylight or ambient indoor lighting. This provides what is known as Photopic vision, which includes full colour range, responsiveness to small, fast movements, and greatest sensitivity in the foveal area of the eye as this is where the cones are most concentrated.

In low light level conditions, such as dim lighting or moonlight, the rods are more active and Photopic vision gives way to Scotopic vision. This is characterised by monochrome vision, low responsiveness to small, fast movements, and greatest sensitivity in the area outside the fovea.

In red lighting conditions, both types of vision can be used, allowing high acuity from the cones while preserving the sensitivity of the rods. This also allows illumination to be provided while preserving the chemical changes that occur in the photoreceptors during the transition between Photopic and Scotopic vision.

During the transition between the types of vision, the so-called Pukinje effect or "blue shift" may occur. As the eye adapts to darkness, the peak luminance sensitivity of the human eye shifts towards the blue-green end of the spectrum. This effect introduces a variation in contrast under different levels of illumination. It occurs because the cones are sensitive to red, green and blue light but require higher levels of illumination to stimulate them than the rods. The rods cannot discriminate colour but are more sensitive at low light levels than cones and have the greatest response to light in the blue-green end of the spectrum. As the light intensity reduces the cones are stimulated less, washing out most of the perceived colour. However, the objects emitting or reflecting blue-green wavelengths appear relatively brighter than objects emitting or reflecting light at the red end of the spectrum due to the sensitivity of the rods at the shorter (blue/green) wavelengths.

Figure 1:
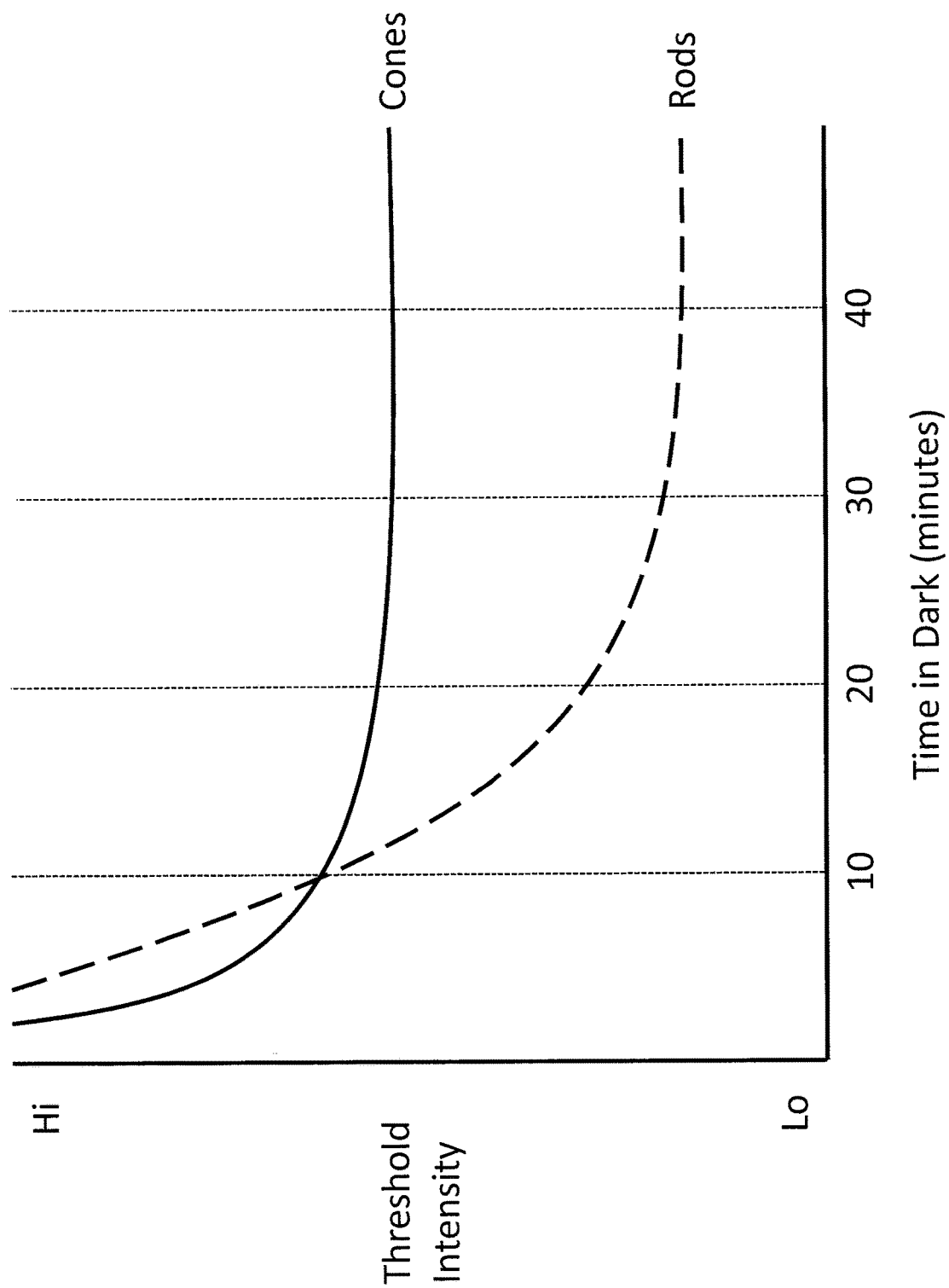
FIG. 1 shows the changing sensitivity of different retinal receptors during dark adaptation.

FIG. 1 is a graph showing the decrease in the intensity of light required to activate the two primary photoreceptors in the human retina. The vertical axis shows the threshold intensity from a high threshold to a low threshold. This indicates the intensity of light required before the light is detected. The lower the threshold, the more sensitive the photoreceptor is.

The horizontal axis shows the time spent in the dark in minutes, divided into units of ten minutes, which are indicated with vertical lines which intersect the curves showing the sensitivity of the photoreceptors.

Of these curves, the solid line shows the sensitivity of the cones, which are used for colour vision. These photoreceptors are more sensitive in bright conditions, but they do not have a large range of sensitivity and so are less active in low light conditions. The sensitivity curve levels out after about ten minutes in darkness and there is negligible further improvement in sensitivity.

The dotted line shows the sensitivity of the rods, which are used for monochrome and low-light vision. Naturally, they are capable of a much higher level of sensitivity, as is shown on the graph in FIG. 1 by the fact that this curve reaches a much lower threshold intensity—representing a lower level of brightness, or luminance, required for activating the rods and therefore higher sensitivity—than the curve showing the sensitivity of the cones.

Although the rods are less sensitive than the cones after up to ten minutes in darkness, the level of luminance required to activate them continues to fall after the sensitivity of the cones has reached its maximum. The sensitivity of the rods does not level to a maximum until after approximately 30-40 minutes in darkness, as shown by the low level of the threshold luminance for the rods at this point.

Figure 2:
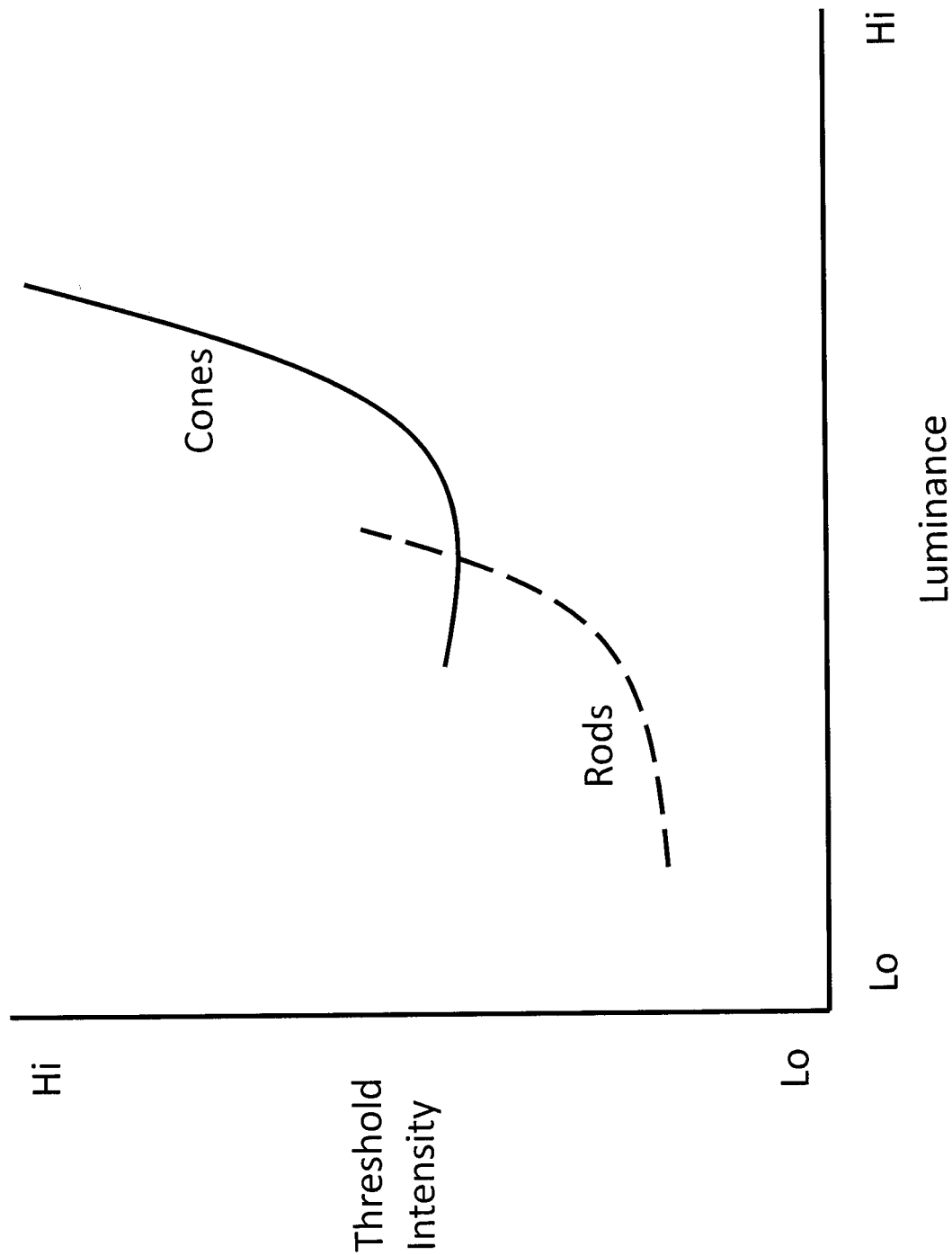
FIG. 2 shows the changing sensitivity of different retinal receptors during light adaptation.

FIG. 2 shows the sensitivity of photoreceptors which have adapted to low light intensity as described in FIG. 1. Specifically, it shows the increasing intensity of light required to activate the rods and cones: as described in FIG. 1, the higher the threshold intensity as shown on the vertical axis, the greater the intensity of light required for activation of the appropriate photoreceptor. The solid line shows the sensitivity of the cones and the dashed line shows the sensitivity of the rods.

An increase in luminance reverses the chemical changes generated as part of dark adaptation and will cause a change from Scotopic to Photopic vision in less than 5 minutes, regardless of the size of the increase, provided it is sufficient to activate the cones. The level of the luminance is shown on the horizontal axis. If the light is very bright, the user will be "dazzled" as his or her photoreceptors are overstimulated; as such, during the light adaptation period the photoreceptors will be less sensitive. This is shown by the sharp upwards curves shown in the Figure.

During light adaptation, the retinal sensitivity gained during the process of dark adaptation described in FIG. 1 is lost, but the colour vision and increased acuity associated with Photopic vision are gained as the rods are inhibited and the cones are re-activated.

Red light is an exception to this pattern; red light at higher than threshold luminance will have a reduced impact on dark adaptation of the rods but will stimulate the cones sufficiently for Photopic vision to return. This means that an eye which has been exposed to red light can be assumed to be dark adapted as if it has been exposed to an extremely low light level, so exposure to red light will significantly shorten the time required for full dark adaptation.

As previously mentioned, FIG. 1 and FIG. 2 show chemical changes which are predictable and can therefore be modelled. The present invention is preferably based on such a model of the reactions of the eye to light within the system.

Figure 3:
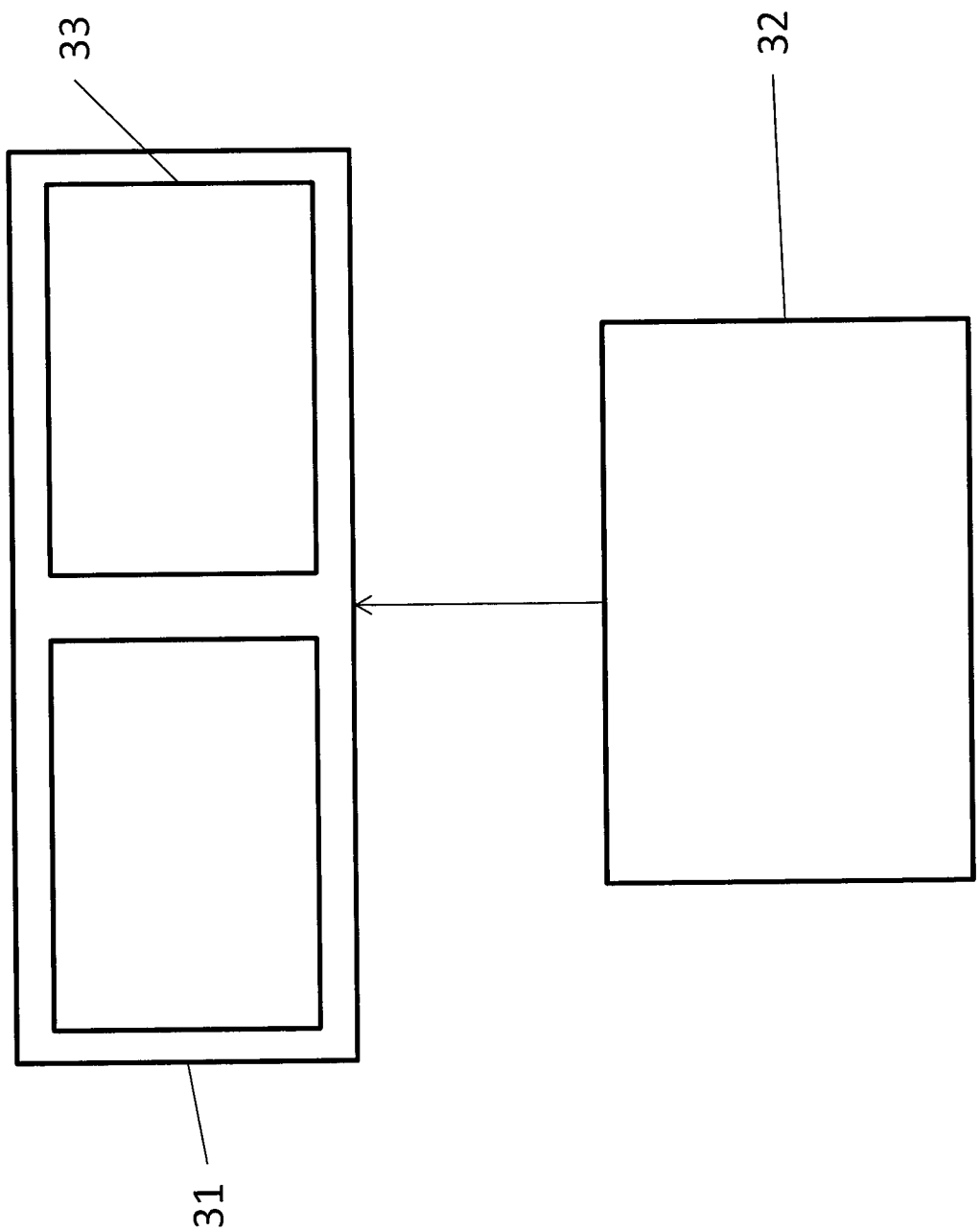
FIG. 3 shows one embodiment of a system according to the invention.

FIG. 3 shows a virtual reality headset [31] connected to a host device [32], which may be a computing device, gaming station, etc. The virtual reality headset [31] incorporates two display panels [33], which may be embodied as a single panel split by optical elements. In use, one display is presented to each of a viewer's eyes. The host device [32] generates image data for display on these panels [33] and transmits the image data to the virtual reality headset [31].

The host device [32] may determine, as it generates image data for transmission to the virtual reality headset [31], how bright the images will be. In general, if the images are below a certain threshold of luminance, the host device [32] then begins timing how long the luminance of the images being transmitted remains below that threshold (similarly, if the initial image data is below the threshold of luminance, the host device [32] would begin timing when the stream of image data is initialised). It might also immediately reduce colour depth and resolution to a minimum as the user will not be able to detect image detail.

If the luminance remains below the threshold for more than a period of time, e.g. ten minutes, the host [32] could adjust the image data being sent to reduce the number of shades of colour compared to the number in the image data as generated; drop red and yellow components of the light transmitted to leave only the blue components in order to account for blue shift; and/or potentially finally drop the colour density entirely to monochrome after a further, longer period of time, e.g. forty minutes. Furthermore, the host [32] could also reduce the resolution of the image to a minimum after this time. If the colour depth and resolution were reduced to a minimum upon the luminance falling below the threshold, they might be restored to low levels after ten minutes in order to account for dark adaptation. The process would then continue as described.

Because of the changing sensitivity of different parts of the user's retina, such loss of detail will not be visible and as a result less data can be transmitted without any decline in user experience.

Similarly, if the light level suddenly rises, for example there is a flash or the scene being viewed is otherwise suddenly lit, the host [32] can continue to send display data with very little colour information, or indeed detail in general, for a period of time commensurate to the period for which the luminance of the frames has been low. This is possible without affecting the quality of the images perceived by a user because after a long period of exposure to low-luminance images the user's photoreceptors will be at their most sensitive, as indicated by the adaption model of the eye, and they will therefore be overstimulated by a sudden increase in luminance, reducing his or her acuity and sensitivity to colour.

If the light level continues to be high the frame rate and colour quantisation may be gradually increased, again based on assumptions regarding light adaption as shown in FIG. 1. This is necessary because a user will lose dark adaptation and his or her photoreceptors will no longer be overstimulated.

The user could also be "pre-conditioned" by spending a known amount of time in a darkened or red-lit environment prior to putting on the virtual reality headset [31] and the display data transmitted for display could then be amended from the beginning rather than waiting for time to pass. The use of such a method could be indicated to the host [32] via an override signal, which will pre-configure an adaption model.

Figure 4:
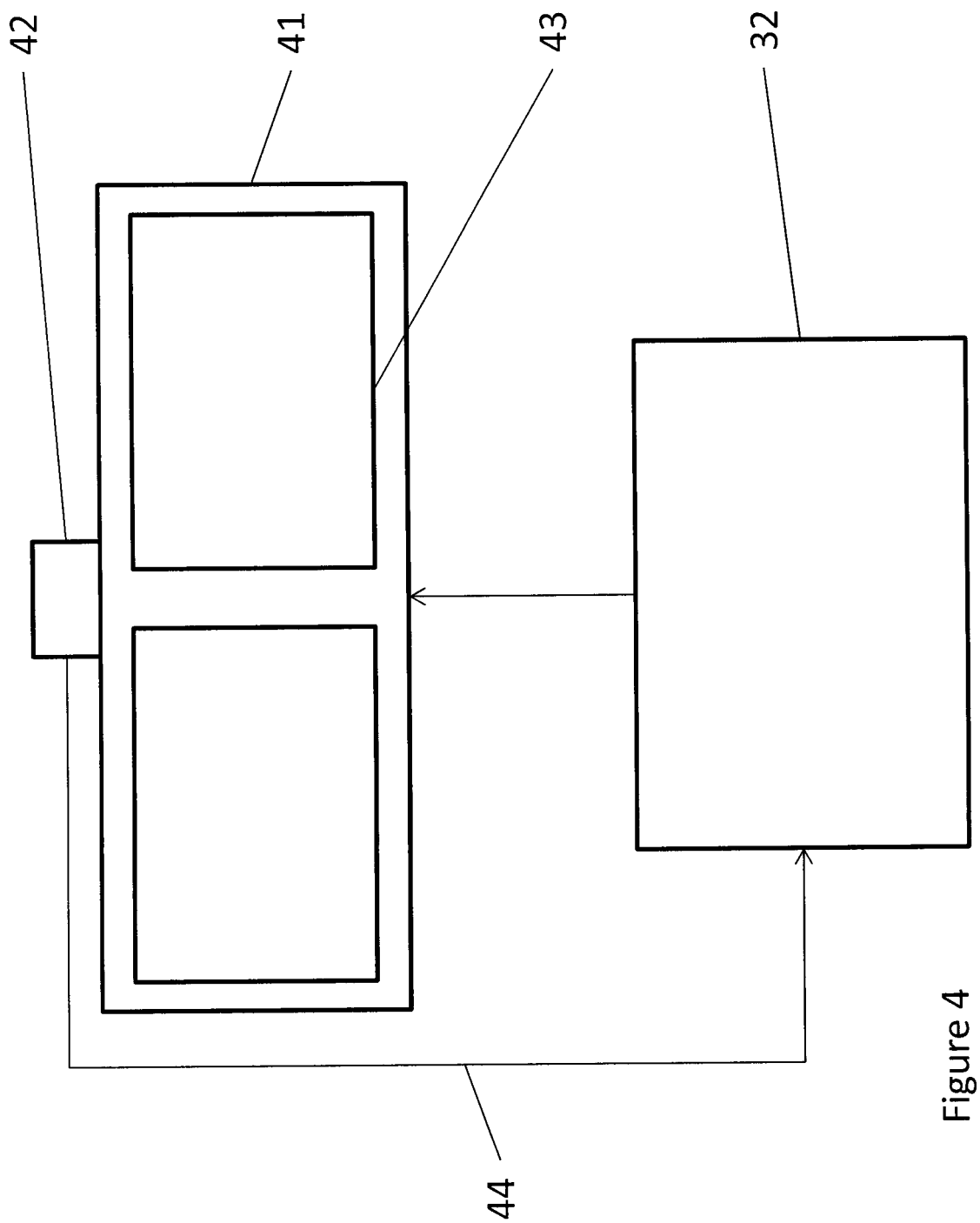
FIG. 4 shows an embodiment of the system with an external light measurement device.

FIG. 4 shows a second possible system. As in FIG. 3, there is a host device [32] connected to a headset [41], but in this example the headset [41] is a set of augmented reality glasses. As in the virtual reality headset [31] described in FIG. 3, there are two display panels [43], each associated with one of the user's eyes, but in this example the display panels are translucent, so if they are being viewed by a user the adaptation of his or her photoreceptors will also be affected by ambient light. Accordingly, there is an external light measurement device [42] attached to the glasses and connected to the host device [32] in order to measure such luminance.

The host device [32] may be a static computing device such as a computer, gaming console, etc., or may be a mobile computing device such as a smartphone or smartwatch. As previously described, it generates image data and transmits it to the augmented reality glasses [41] for display.

The light measurement device [42] is connected to the host device [32]. It acts as a sensor to detect the ambient light level, and transmits [44] this to the host device [32], which may then send data with a reduced colour gamut or resolution generally, as previously described. In this case, the data received [44] from the light measurement device [42] would be used in the same way as data collected on the luminance of the frames being transmitted to the display panels [33] in the virtual reality headset [31] described in FIG. 3, possibly in combination with knowledge of the luminance of the generated frames as previously described.

Alternatively, a camera pointed at the display panels [43] could act as a light measurement device, as this would provide actual knowledge of the light being presented to a user's eyes. Such a camera could be mounted on, for example, an arm of the glasses, or on the user's face near or even inside his or her eyes, for example as part of a contact lens.

Figure 5:
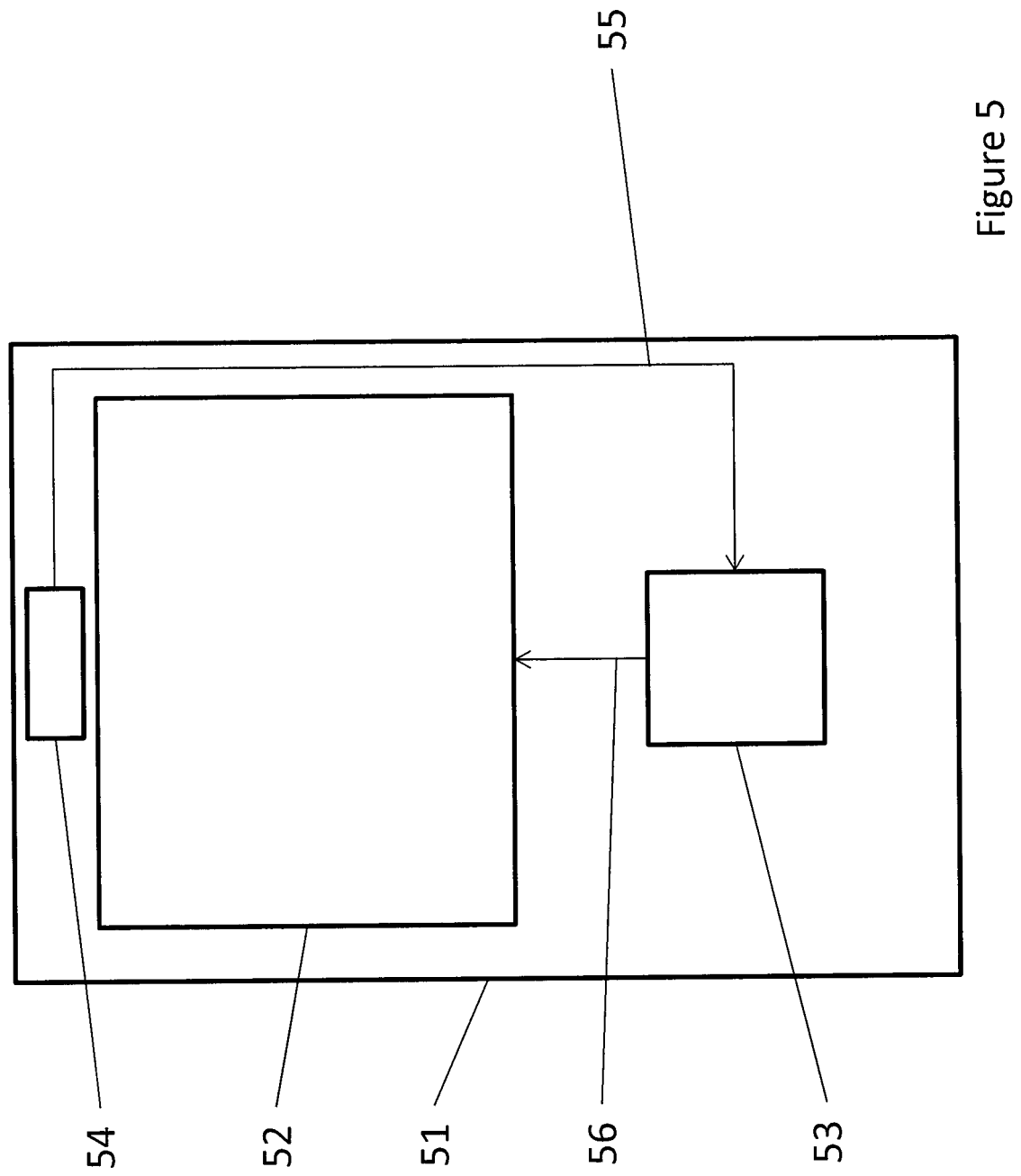
FIG. 5 shows an embodiment of the system which is contained in a single device.

FIG. 5 shows a system which is similar in operation to the embodiment shown in FIG. 4. In this case, however, there is no separate host device [32]. The entire system is contained in a single casing [51], for example in a smartphone or other such mobile computing device. The device contains a processor [53], which generates display data for display on the integral display panel [52].

The device [51] also has an external light measurement device [54], similar to that described in FIG. 4. Since the device [51] will not be enclosed, ambient light will affect the dark adaptation of any user's eyes, and as in the system described in FIG. 4, the external light measurement device [54] monitors the ambient luminance. Alternatively, a camera pointed at the display panel [52] could act as a light measurement device, as previously described with reference to FIG. 4. In either case, the camera or light measurement device [54] transmits [55] this data to the processor [53], where it is used to adjust the image data transmitted to the display panel [52] as previously described.

Since the system is entirely internal, the connection between the processor [53] and the display panel [52] is less likely to have a limited bandwidth compared to the connection between the host device [32] and either the virtual reality headset [31] described in FIG. 3 or the augmented reality glasses [41] described in FIG. 4. This means that it is less important to reduce the volume of data transmitted to the display panel [52], but nonetheless the bandwidth is unlikely to be infinite and therefore there may still be benefits to reducing the volume of data, including memory use and latency.

Similar systems are currently used to lower the brightness of the backlight in internal displays such as those in mobile devices. However, this is a different type of system as it involves lowering the brightness of the backlight only; the display data is unchanged.

Figure 6:
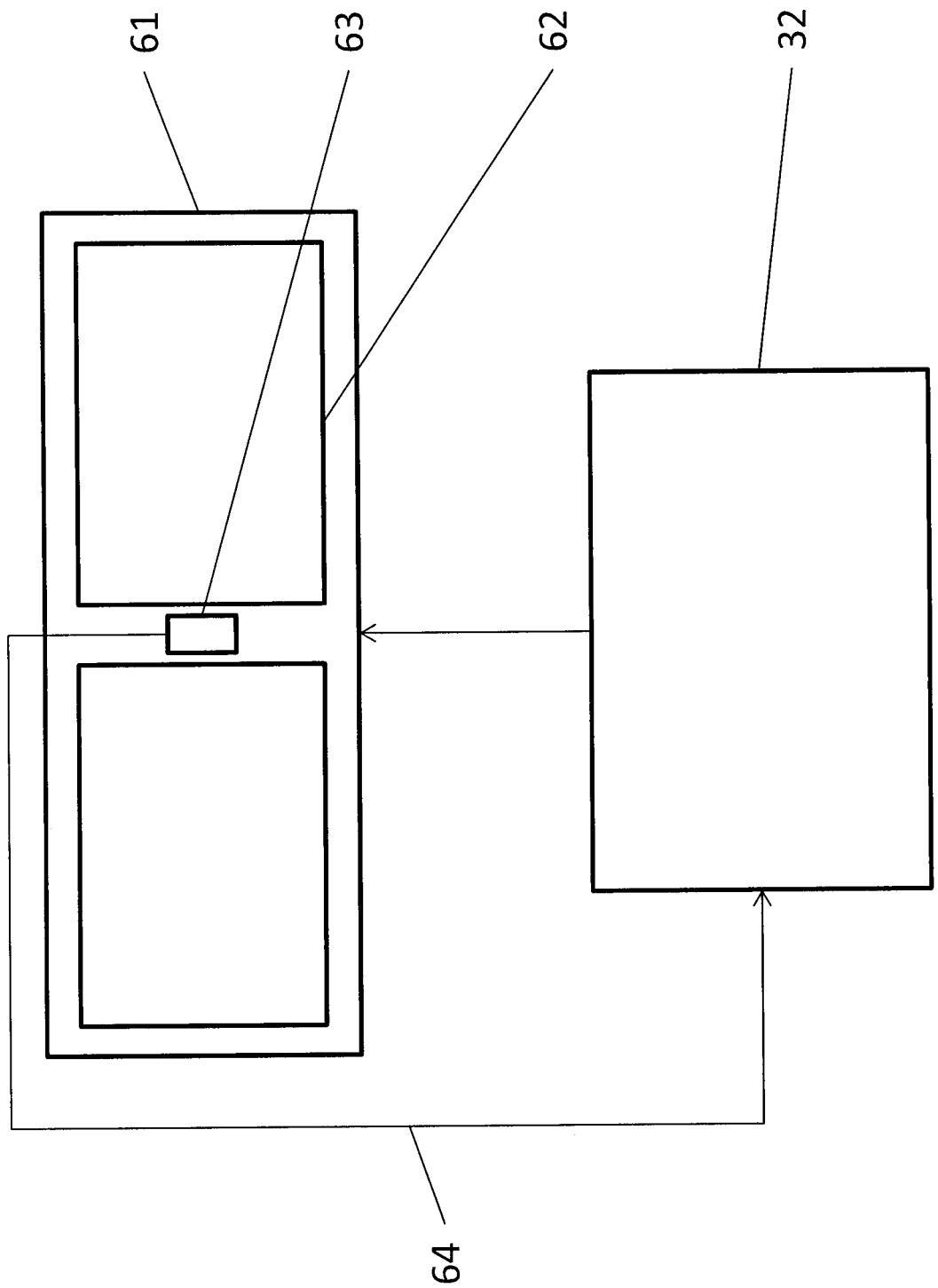
FIG. 6 shows an embodiment of the system with an internal light measurement device.

FIG. 6 shows a further example of a system in which a virtual reality headset [61] is connected to a host device [32]. As previously described, the virtual reality headset [61] incorporates two display panels [62], one of which is presented to each of the user's eyes, and is itself likely to be sealed against ambient light when in use.

In this embodiment, the virtual reality headset [61] incorporates an internal light measurement device [63]. As previously described, this is connected to the host device [32], but unlike the light measurement device [42] described in FIG. 4, it transmits data on the luminance within the virtual reality headset [61]. This will detect the combination of ambient light level actually present within the virtual reality headset [61] and the display such that, for example, if there are warning lights not controlled by the host [32], their use will still be detected. The light measurement device [63] then transmits [64] this information to the host [32], which can apply appropriate adjustments to the display data being transmitted to the display.

Alternatively, a camera pointed at the display panels [62] could act as a light measurement device, as previously described with reference to FIG. 4.

The use of this system also means that if it is not convenient to determine the luminance of frames as they are transmitted from the host [32], for example due to limited processing power in the transmitter or if the data is strongly encrypted, the described methods can still be used to amend the data as previously described during generation.

Figure 7:
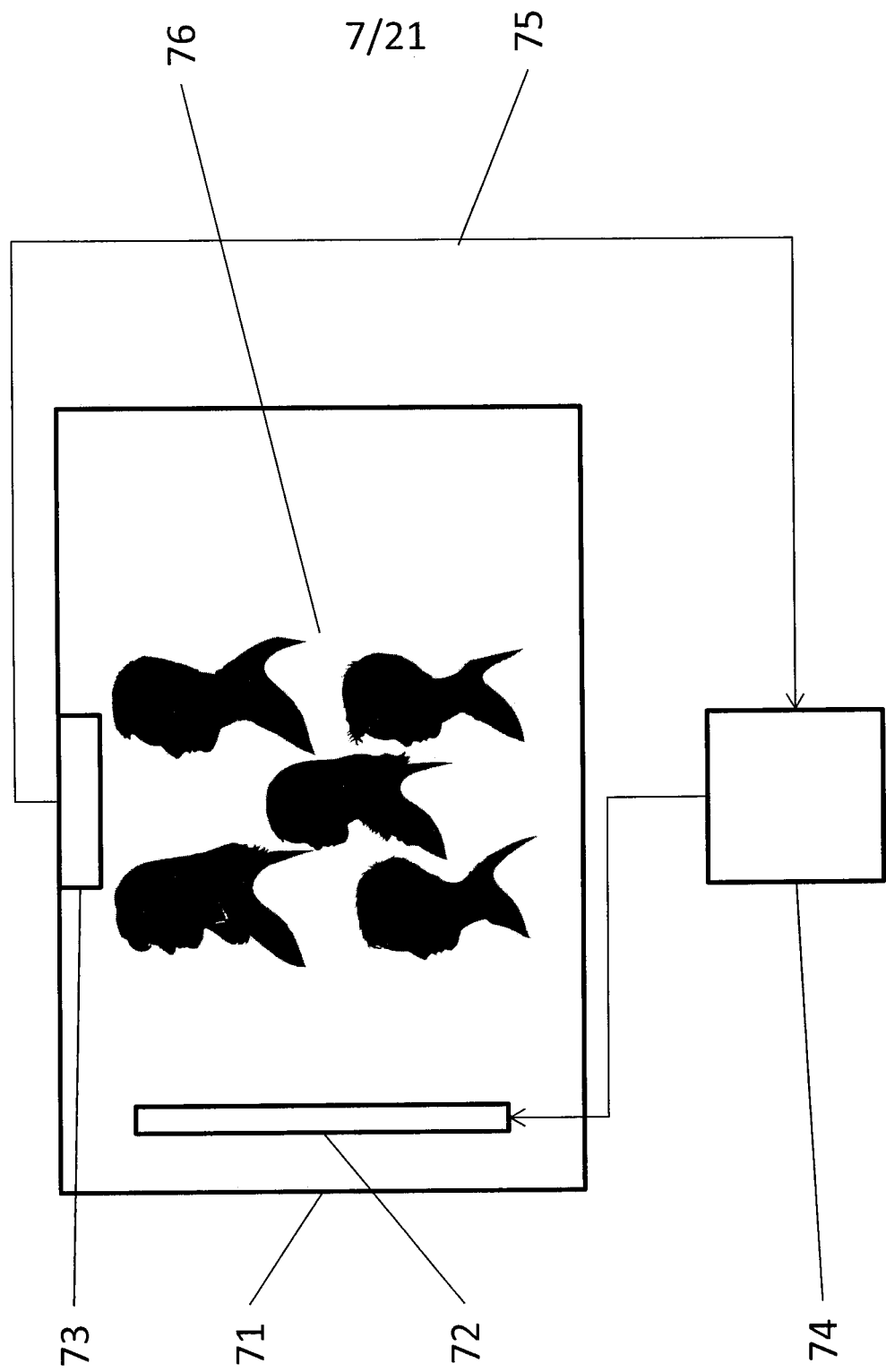
FIG. 7 shows an embodiment of the system which is contained in a large space.

FIG. 7 shows a system which is similar in operation to the system shown in FIG. 6 in that there is an enclosed area [61/71] containing a display device [62/72] and a light measurement device [63/73], and the user(s) [76] is/are viewing the display device [62/72] from within the enclosed area [61/71]. In this embodiment, the system is in a theatre setting, or similar environment such as a motion-simulator fairground ride.

The display device [72] is a screen at the front of the environment [71]. It is being viewed by multiple users in an audience [76]. The actual light level in the enclosed space [71] is detected by a light measurement device [73] and transmitted [75] to the host [74], and therefore if there is a change in the light level not controlled by the host [74] which is providing the display data for the display, such as a member of the audience [76] opening an exit door into a lit vestibule, the resulting changes in the audience's [76] dark adaptation can be accounted for. Since the chemical changes to the photoreceptors of the human eye are largely uniform across the population, it is likely that the eyes of all members of the audience [76] will adjust to lower light levels at the same rate.

Furthermore, this embodiment could be used for a method in which the light level is controlled in order to manipulate the user's or users' [76] dark adaptation prior to showing display data. In such a method, the enclosed area [71] is sealed against ambient light for a long period (up to forty minutes) prior to the beginning of transmission of display data by the host [74]. The display data could then from the beginning be amended as previously described. Optionally, but beneficially, the enclosed area [71] could be red-lit during this time in order to allow the users [76] to see enough to move around. This is possible due to the effects of red light on the photoreceptors described above, meaning that a user can move from red light to darkness and be assumed to be essentially dark adapted.

Similarly, if the nature of the content to be transmitted as display data is known—for example, it is a pre-generated video clip, or a feed from a camera that only produces a particular type of display data—the time between the enclosed area [71] being sealed against ambient light and the beginning of transmission of display data could be adjusted accordingly. For example, if the audience [76] is to view a brightly-lit scene from a film on the display device [72], very little time elapses before display begins, but if the audience [76] is to view a projection of the night sky, which will be dim and monochrome, the full forty minutes may be allowed to elapse.

Naturally, similar methods could be used for a single user using a virtual-reality headset [61] such as that shown in FIG. 6, and similarly a user could spend time in an area sealed against ambient light before using the virtual-reality headset [61] in order to allow his or her eyes to adjust to low light levels.

Figure 8:
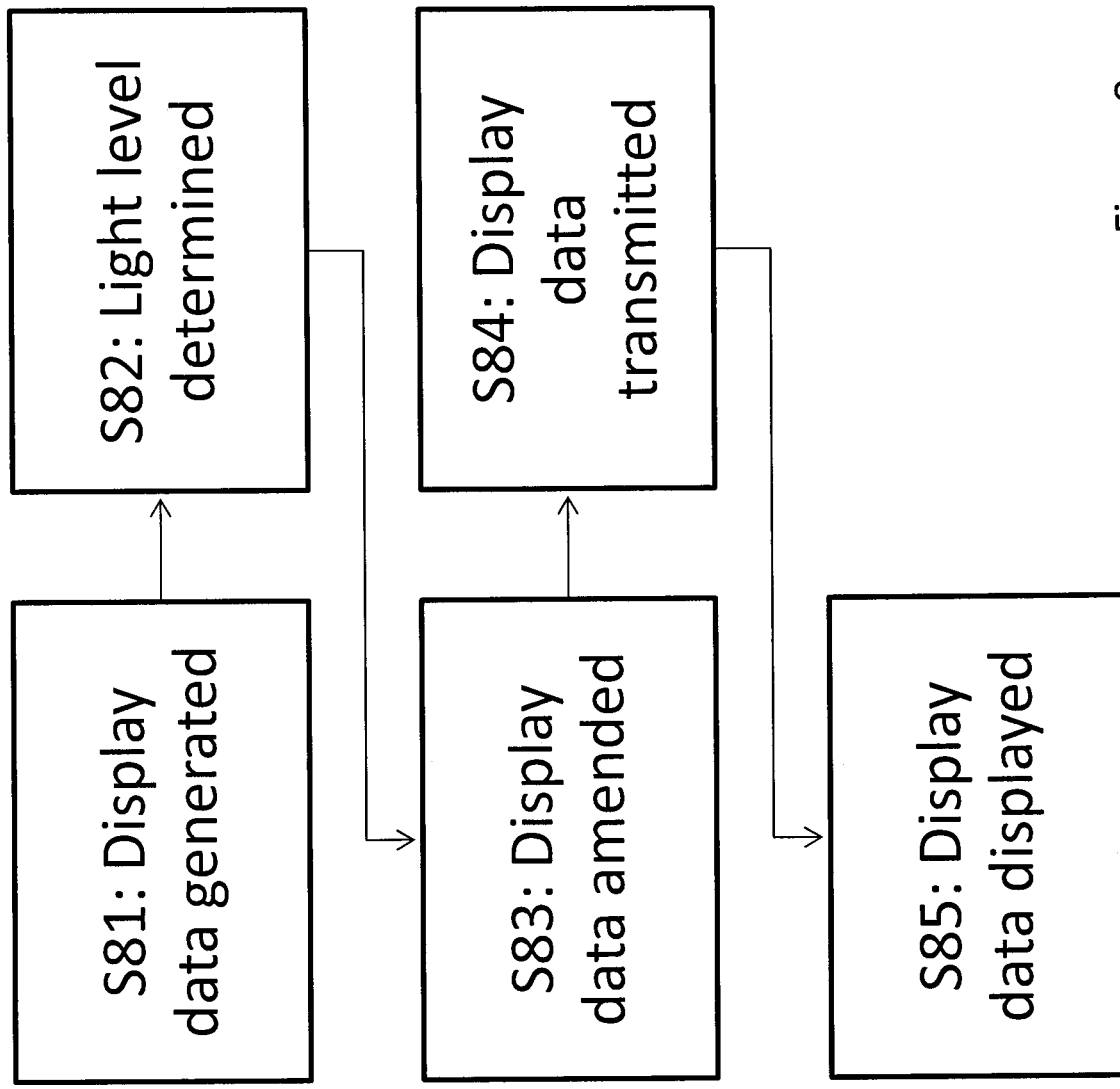
FIG. 8 shows a flow chart of a method according to an embodiment of the invention.

FIG. 8 shows a flowchart of a generic version of the process followed, which will be described with reference to the embodiment shown in FIG. 3, with deviations for the other embodiments described as appropriate.

At Step S81, the next frame of display data is generated in the host [32] according to the operation of applications running on the host [32].

At Step S82, the current or most recent light level is determined. In the embodiment shown in FIG. 3, this means determining the light level of the frame most recently sent for display, combined with the light levels of other recent frames sent for display, for example over the last minute or the last 120 frames. As previously described, this may mean maintaining a timer for how long the frames have been below a specified threshold luminance. If there have been no previous frames, the luminance may be determined as a pre-set default luminance.

In the embodiments shown in FIGS. 4-7, which include light measurement devices [42, 54, 63, 73], the luminance may be determined using the luminance as detected by the light measurement devices [42, 54, 63, 73], likely combined with the recent light level in a similar way to the luminance of a transmitted frame, and the output from the light measurement devices [42, 54, 63, 73] may be used in conjunction with the luminance of frames.

Step S83, the amendment of the display data, may be subsequent to the generation of the display data in that data may be generated and then amended, perhaps improving the compression applied prior to transmission. Alternatively, the first two steps may be reversed so that the information generated at Step S82 on light level may be fed directly into the processes generating the display data such that only appropriate display data is generated at all, in which case Steps 81 and 83 are combined.

In either case, at the end of Step S83 only the data which can be assumed to be most beneficial to any user viewing the images is prepared for transmission. This removes redundant data prior to the compression/transmission, improving efficiency.

For example:

If the time period since the determined luminance was above a threshold ("T") is short (say, less than five minutes), the display data can be presented at full colour depth and frame rate. If appropriate, foveal compression could also be used to reduce the quality of peripheral areas of the display without affecting user experience (naturally, if many people are viewing the same image, as in the embodiment in FIG. 7, foveal compression would not be possible; it uses eye-tracking in order to determine the point of focus of a user). This is because any user will still be using Photopic vision and therefore will have high acuity and responsiveness to fast movement and will be able to see a full range of colour, and due to the distribution of photoreceptors the user's fovea will be the most sensitive area of the retina.

As an addition to this example, if a particular frame has a luminance below a threshold it can be amended to have a lower resolution and therefore less detail. This is possible because a user's eyes will not be sensitive enough in low light to see such detail; only the rods in the eye are being stimulated, and these have lower density in the retina, so cannot perceive the normal full light level resolution. Such amendment may be carried out in the compression process through application of lossy compression methods, or by a reduction in the detail by, for example, downscaling in rendered images, especially in computer-generated images. For example, small text need not be rendered clearly.

If T is approximately ten minutes, red and yellow colour components could be dropped, leaving only blue components in an image that is otherwise monochrome, and foveal compression should no longer be used. This is appropriate because the sensitivity of the cones will level to a minimum while the rods will no longer be saturated and will be entering their working range. Thus, as previously described, the user will be transitioning between Photopic and Scotopic vision, at which point he or she will lose the ability to see detailed differences in colour, but the monochrome perceived contrast will change due to the Pukinje effect. Furthermore, the perifoveal area of a user's retina will be becoming more sensitive than the fovea due to the distribution of photoreceptors, hence the reduction in usefulness of foveal compression.

If T is approximately twenty minutes, the number of frames transmitted to the display could be reduced, along with their colour quantisation; at this point all colour information could be removed and the frames could be displayed as monochrome images. This is appropriate because any user will be using Scotopic vision and therefore will have low acuity, reduced sensitivity to small, fast movements, and monochrome vision. These reductions can increase for up to forty minutes, at which point no further amendments should be made as a user's rods will have reached full sensitivity.

Correspondingly, if the luminosity of the display data increases suddenly—for example, by a factor of greater than 20% between two frames—the host may then send lower-quality frames for, say, a second even if the luminosity then returns to its previous level. This is possible because if the user is exposed to sudden very bright light he or she will be "dazzled" and will lose detailed vision for a short period.

Such methods may lower the volume of data by applying efficient coding, even if compression is not used, as permitted by the changes in perception of detail and colour described with reference to FIG. 1. However, compression may also be applied at this stage to further reduce the volume of the data to be transmitted across a limited-bandwidth connection to the display.

This transmission is then carried out at Step S84. If the data was compressed and/or encrypted prior to transmission, it may be received by a display control device connected to the display device receiving the data [33], which may perform decompression and decryption as appropriate. The amended display data is displayed at Step S85.

Figure 9:
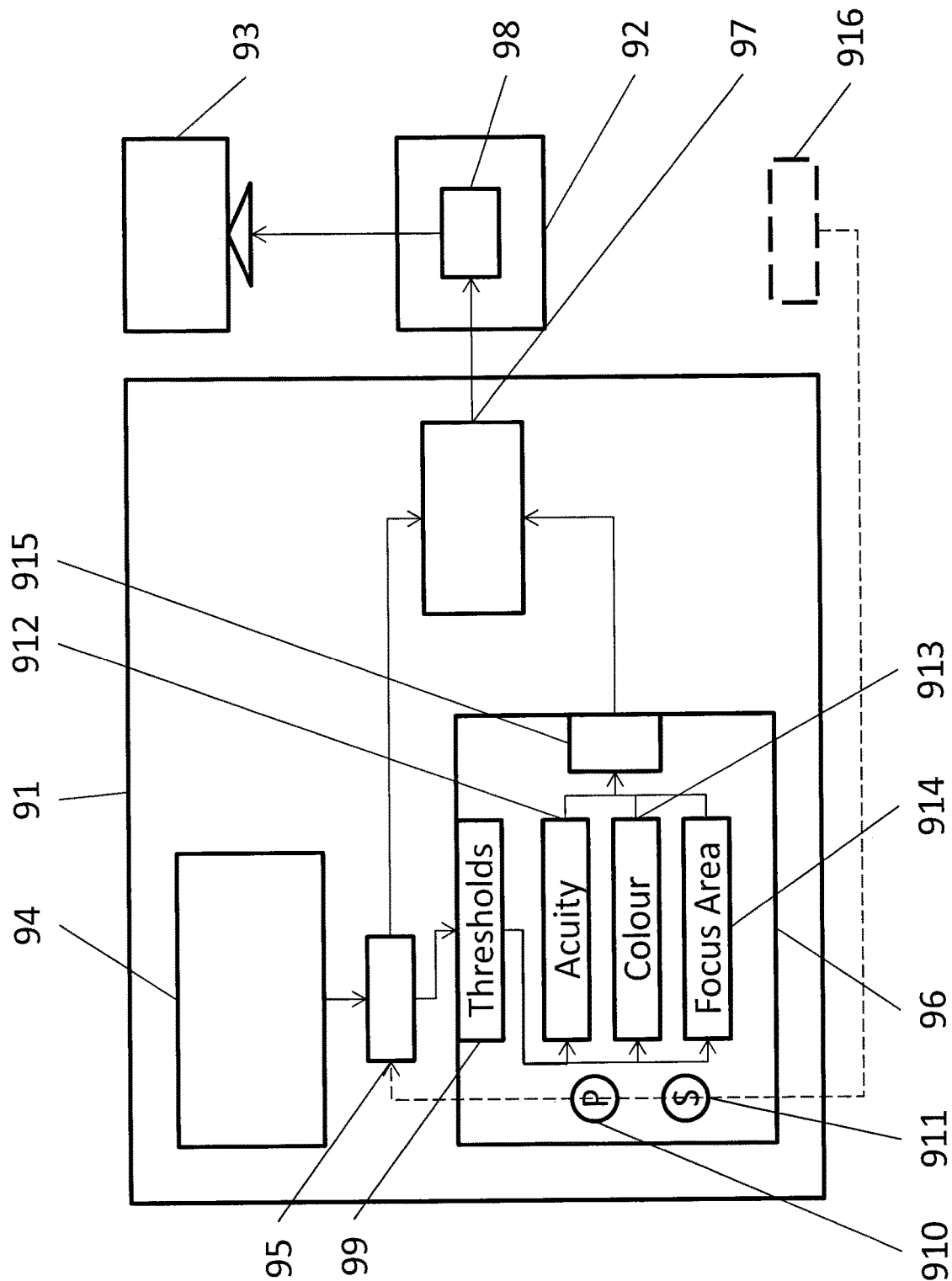
FIG. 9 shows a more detailed example system, with a model eye.

FIG. 9 shows a more detailed block diagram of a system, showing a possible embodiment including a model of reactions of an eye to changes in light. This model is based on assumptions regarding the eye of a user, as described in FIGS. 1 and 2, but operates independently of the actual presence or absence of a user.

The majority of the system is incorporated into the host [91], which is connected to a display control device [92], which is in turn connected to a display device [93]. This display device [93] may be part of a virtual-reality headset such as those shown in FIGS. 3 [33] and 6 [62], a set of augmented-reality glasses such as that shown in FIG. 4, a hand-held device such as that shown in FIG. 5, or a theatre such as that shown in FIG. 7, or any other display system as appropriate. Likewise, the display control device may be part of such a headset [31, 61], pair of glasses [41], or device [51], or simply connected to a display device.

Among other components, the host [91] includes a GPU [94], which generates display data for display on the display device [93]. This display data is most likely to be in the form of frames or parts of frames, which are passed to an analysis module [95] when complete. Alternatively, it may be passed to the analysis module [95] and also directly to the compression engine [97], in which case the analysis module [95] will not pass the frame to the compression engine [97] once analysis is complete.

The analysis module [95] analyses the frame in order to extract the luminance and dominant or average colour of the frame. This allows the system to monitor the level and colour of light that will be emitted by the display device [93]. The analysis module then transmits the frame on to a compression engine [97] and the luminance and colour information to a processor [96] which contains the model of reactions of an eye to changes in light.

The model includes a set of thresholds in a comparison engine [99] to which the luminance of the frame produced in the GPU [94] is compared. The thresholds [99] consist of at least a main threshold, which indicates the luminance at which the "eye" should begin dark adaptation, and a "dazzle" threshold, which indicates a luminance so high that it would overstimulate any user's photoreceptors.

There are also two clocks [910, 911], of which one [910] measures the length of time for which the "eye" has been exposed to bright light and is known as the "Photopic" timer since it will allow the model to simulate the time at which a real eye would be likely to have returned to Photopic vision. The other [911] measures the length of time since the "eye" was last exposed to bright light and is known as the "Scotopic" timer as it will allow the model [96] to simulate the time at which a real eye would have adjusted to use Scotopic vision. In the same way as there are many thresholds [99], there may be many Photopic and Scotopic timers [910, 911], associated with different thresholds [99]. In an embodiment where the exposure of a user to light can be controlled before he or she begins viewing display data, information regarding such prior exposure could be used to initialise the timers [910, 911] at values other than zero. For example, if a user is required to remain in a dark area for twenty minutes prior to the display of images on the display device [93], the Scotopic timer [911] could be initialised at twenty minutes and the system would behave accordingly.

The values of the timers [910, 911] are used to calculate the level of dark adaptation and are used along with the results of comparison to the thresholds [99] as inputs for the three specific adaptation elements [912, 913, 914]. Of these, the first [912] indicates the acuity of the "eye". This indicates the level of detail that will be perceptible, as well as the eye's ability to see small, fast movements. The second element [913] indicates the colour perception of the "eye", and the third [914] indicates the focus area: specifically, whether there should be a foveal focus area, in which the point of focus on an image is high-quality while the periphery can be neglected. For this purpose, there may be an input from an eye-tracking mechanism when the system is in use, which will be used as input to either the processor [96] or the compression engine [97]. Without such a mechanism or in the absence of data, this element [914] could be omitted or ignored.

Together, the thresholds [99], clocks [910, 911], and adaptation elements [912, 913, 914] provide a selection of parameters based on which the monitored light may be analysed.

Naturally, as more research is carried out into the perception capabilities of the human eye, such a model may be embellished and extended to add further adaptation elements [912, 913, 914] or to change those listed.

Each element [912, 913, 914] outputs an instruction regarding its particular part of the display data: resolution and frame speed, colour rendering, and focus area respectively.

These are gathered by an instruction engine [915] and transmitted to the compression engine [97].

The compression engine [97] compresses the display data received from the GPU [94], via the analysis engine [95], using the instructions received from the processor [96]. For example, it might apply foveal compression to lower the resolution of the periphery while keeping the point of focus on the image high-resolution or, similarly, reduce the luminance depth of the area around the point of focus while relatively increasing the luminance depth of the remainder of the frame; reduce the number of shades of colour preserved; and/or reduce the overall resolution of the image according to instructions from the Focus Area [914], Colour [913], and Acuity [912] elements respectively. This amendment of the display data may be applied alongside other compression methods.

The compressed data is transmitted to the display control device [92] and decompressed in a decompression engine [98] if other compression methods have been applied. The amendments to the display data will survive. The amended display data is then sent to the display device [93] for display.

There may also be a light measurement device [916] which detects ambient luminance, as described in FIGS. 4 [42], 5 [54], 6 [63], and 7 [73]. It is connected to the analysis module [95] and allows ambient light to be taken into account in determining the behaviour of the "eye". This is a further method of monitoring light that may affect the eye of a user. Since it is optional it is outlined in dashed lines, but in some embodiments it may replace the frame as input to the analysis module [95].

Figure 10A:
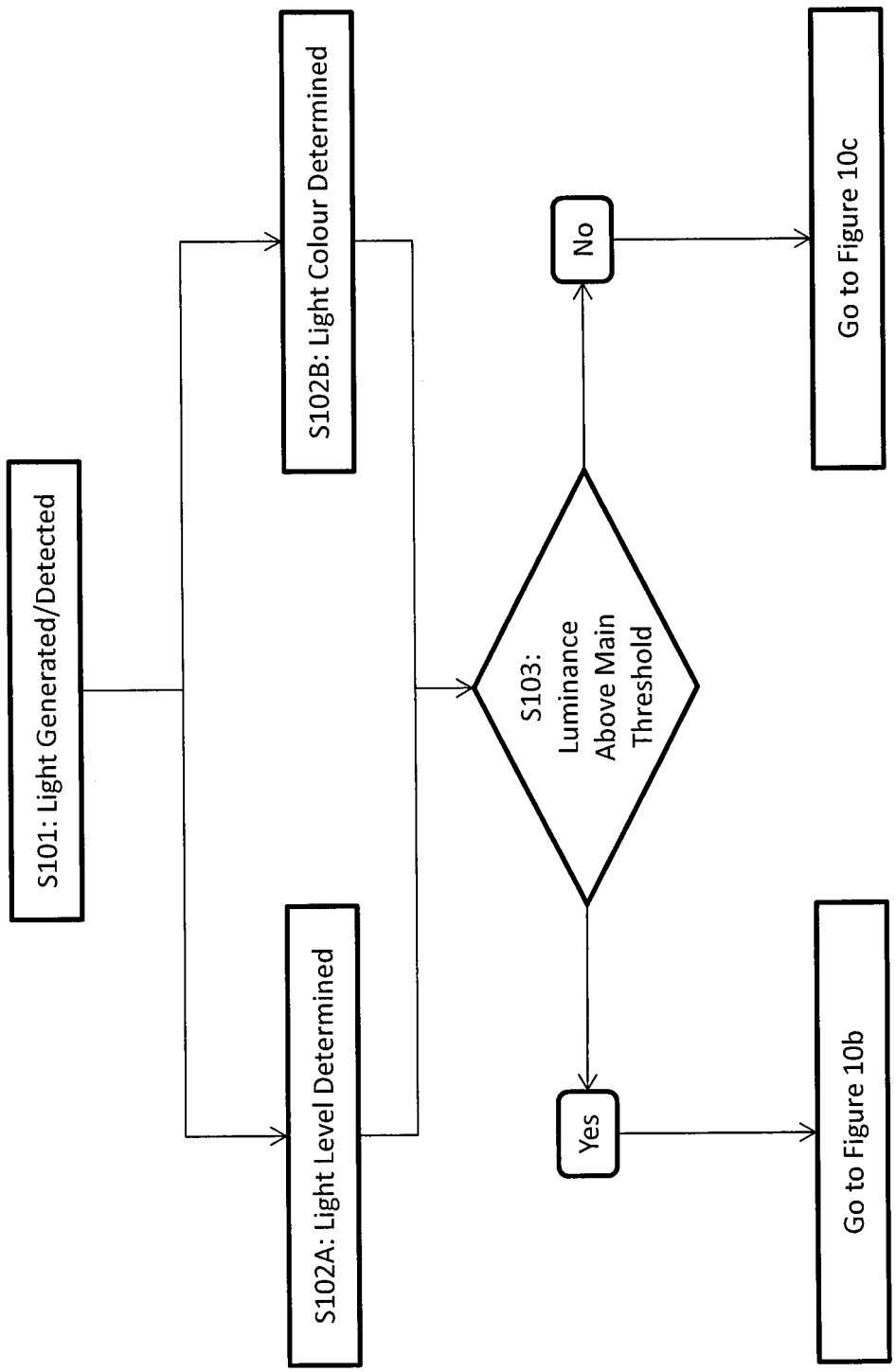
FIG. 10 shows a more detailed example decision-making process.

FIG. 10 shows a more detailed example process for Step S82, which will be described with reference to FIG. 9.

At Step S101, a frame is generated in the GPU [94], consisting of a number of pixels represented, in this embodiment, as Red, Green, and Blue values which will ultimately be displayed from the display device [93] as light. This frame is passed to the analysis module [95], where it is analysed at Step S102. Because there will be two types of analysis performed, this step is shown in FIG. 10 as two steps which occur simultaneously: Step S102A and Step S102B.

At Step S102A, the analysis module [95] determines the luminance of the frame by, in this example, which uses RGB colour components, determining the magnitude of each colour component in each pixel and therefore how bright each pixel will be, then averaging this value across the frame. The result will be a single figure for the luminance of the frame generated at Step S101.

At Step S102B, the analysis module [95] determines the average colour of the frame, using the RGB values across the whole frame. This will also result in a single colour value for the colour component of the light, and may in fact be a simple binary value for whether the light is red or not, since this is the determination that may be required later in this example process. However, it may range from the differences between white light produced by florescent lighting and white light produced by sunlight to the differences between two coloured lights, such as a red light and a green light.

If there is a light measurement device [916], its input may be fed into the analysis module [95] and analysed in the same way, though it is likely to be analysed through spectral analysis rather than analysis of RGB values. Naturally, a form of spectral analysis may also be used on a frame. If both a frame and a light measurement device are used, their values may be combined.

Once both steps are complete the results are sent to the processor [96] containing the model eye and the process proceeds to Step S103. At this step, the luminance determined at Step S102A is compared to the main threshold value in the comparison engine [99]. This will allow the processor [96] to determine whether it would be appropriate to amend the display data being transmitted to the display [93] and the degree of amendment. All references to a threshold value herein may be to one of a number of threshold values. This is necessary to simulate the continua of increasing and decreasing sensitivity of the photoreceptors in a real eye. However, only the "main" and "dazzle" thresholds previously mentioned will be used herein. Other thresholds will operate in a similar manner.

Figure 10B:
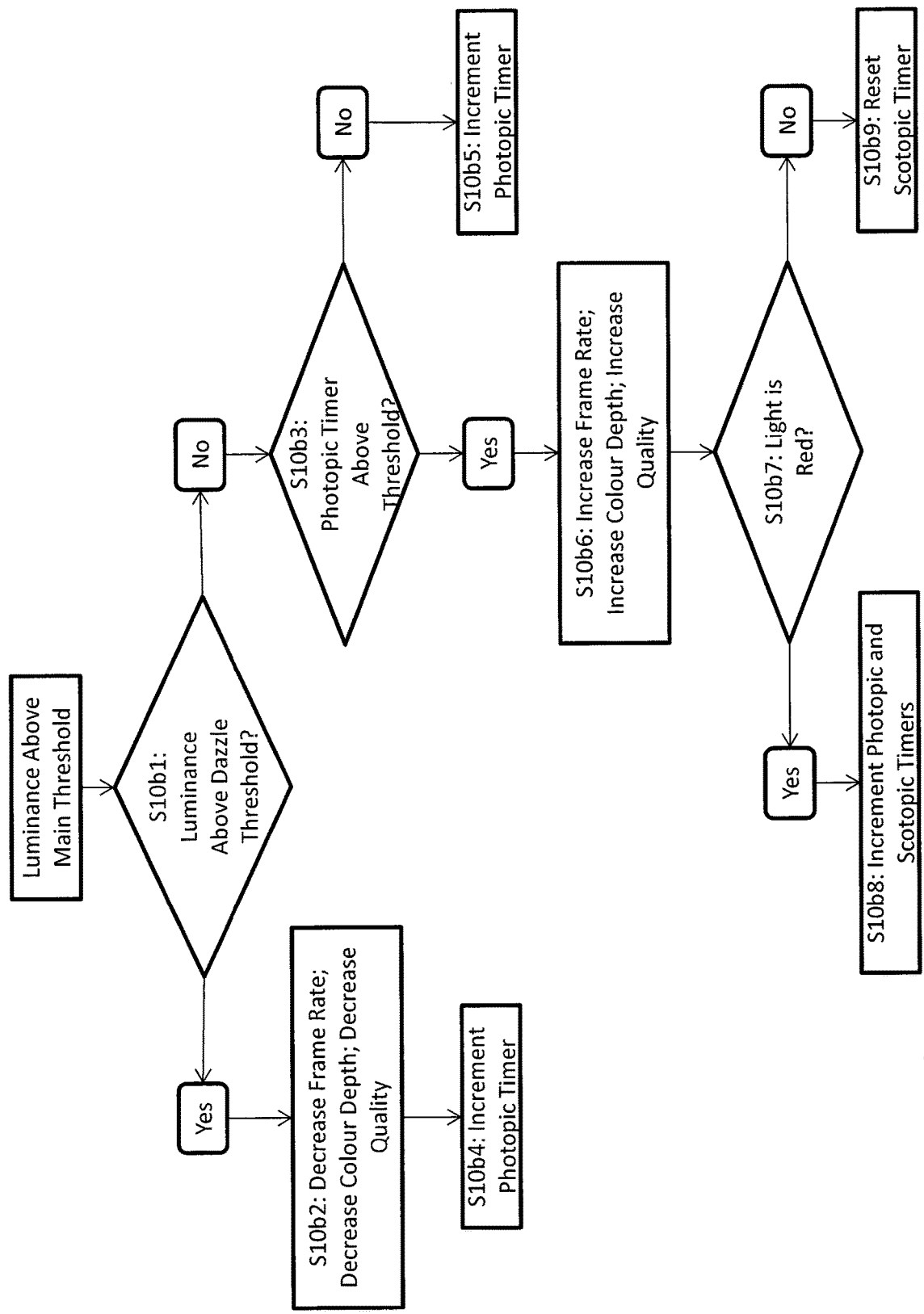
Figure 10C:
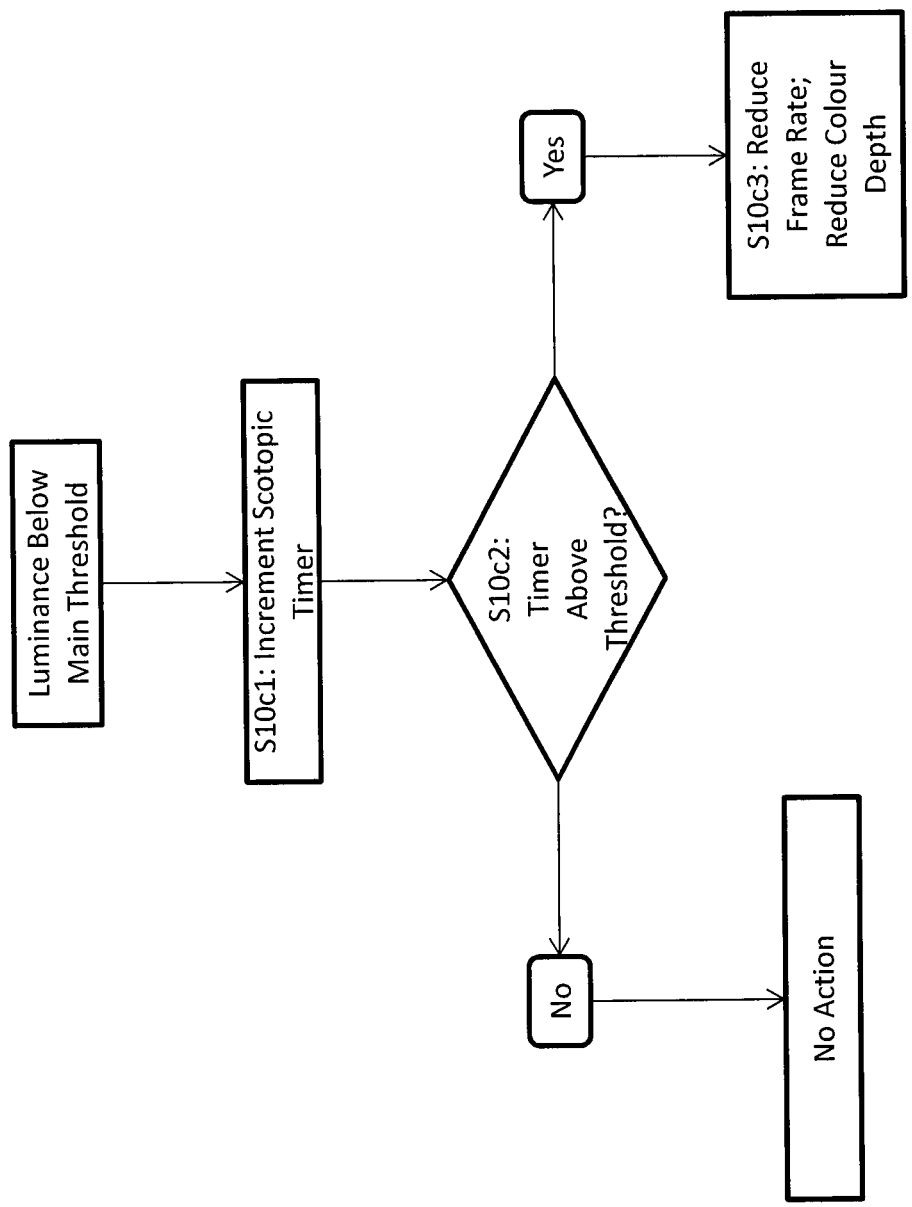

In a first example, the luminance of the frame is determined to be above the main threshold, so the process follows the branch to the left, beginning at "Yes", to FIG. 10b.

At Step S10b1, the comparison engine [99] determines whether the luminance determined at Step S102A is not only above the main threshold but also above the "dazzle" threshold. The "dazzle" threshold may change depending on previous luminance, such that if previously the luminance has been very low over, for example, the previous ten minutes, the dazzle threshold may also be relatively low as any user's photoreceptors would be at their most sensitive and therefore easy to overstimulate. Correspondingly, if the luminance had been high the dazzle threshold may also be very high. The previously-mentioned example of the light being considered to be dazzling if the luminance rises by 20% between two frames is an example of such a flexible dazzle threshold.

In a first example, the luminance does exceed the dazzle threshold and therefore the process follows the left-hand branch beginning at "Yes" to Step S10b2. The results of the comparisons indicate that the "eye's" photoreceptors are overstimulated, and the comparison engine [99] sends a signal to this effect to the three adaptation elements [912, 913, 914], which determine that the compression engine [97] should reduce the resolution, frame rate, and/or colour quantisation of the data and may also or instead increase compression without regard to the quality of the resulting frame. This will not affect any user's experience since his or her photoreceptors will be overstimulated, as indicated by the model [96], so he or she will have low acuity and will be unable to see details, fast movement, and colour detail. The adaptation elements [912, 913, 914] send signals to this effect to the instruction module [915], which passes the instruction on to the compression engine [97], which carries them out at Step S10b2.

Meanwhile, the process moves on to Step S10b4 and the processor [96] increments the Photopic timer [910] to indicate that the luminance is above the main threshold and the "eye" should begin to lose any dark adaptation.

In a second example, the comparison engine [99] determines that the luminance does not exceed the dazzle threshold and the process follows the right-hand branch beginning at "No" to Step S10b3. At this step, the model [96] uses the Photopic timer [910] to determine how long the luminance has been above the main threshold. If the value of the Photopic timer [910] is not above a time threshold, the model [96] increments the timer [910] at Step S10b5. No other action should be taken as it is unlikely that a user's eyes would have returned to Photopic vision.

If the Photopic timer [910] is above the time threshold, the "eye" has lost dark adaptation and the adaptation elements [912, 913, 914] send appropriate signals to the instruction element [915], forming instructions that the compression engine [97] should adapt the display data to have a high frame rate, colour quantisation, and/or resolution at Step S10b6. These values may be the full frame rate, colour quantisation, and resolution of which the host [91] and display device [93] are capable, or they may be reduced from the highest possible level but to a lesser extent than if the luminance had been determined at Step S103 to be below the main threshold. For example, if the Photopic timer [910] has a value of 3 minutes and 5 seconds, the time threshold [99] used for comparison is 3 minutes, frames were being transmitted at 20 frames per second, and the total frame rate of which the system is capable is 64 frames per second, the frame rate may be raised to 30 frames per second. The comparison engine [99] may also begin using a higher threshold for comparison such that if, later, the Photopic timer [910] has a value of 5 minutes and 2 seconds and the new threshold is 5 minutes, the frame rate may be raised again to the full 64 frames per second. Similar methods may be used for colour depth and resolution as appropriate. This is necessary because a real eye is likely to have adjusted to the higher luminance. It will therefore have high acuity and be able to perceive colour differences.

Finally, at Step S10b7 the colour data produced at Step S102B is used to determine whether the received or produced light is red. This may be according to a threshold of average "redness" or may require a particular area or location in a frame to be red. In either case, if the light is red—it has previously been determined to be brighter than the threshold—the processor [96] will increment both the Scotopic [911] and the Photopic [910] timers at Step S10b8. This is so that the model [96] can take into account the fact that red light enables a real eye to dark adapt to a degree or maintain previous dark adaptation.

This does not affect the signals sent by the adaptation elements [912, 913, 914] to the instruction element [915] and hence the instructions sent to the compression engine [97], as Photopic vision can be used under red light, and therefore the data should be amended as described at Step S10b6, as if the light had not been coloured. However, the model [96] should also maintain high sensitivity to future low-light conditions, so the Scotopic timer [911] is also incremented in case the luminance falls below the main threshold in future.

If the true colour of the frames does not matter, the applications running on the host [91] which generate display data could generate frames in shades of red as opposed to the full RGB, meaning that the frames will be analysed as red light. This will allow dark adaptation while still showing the frames at full luminance, as previously mentioned.

If the light is not red, this Scotopic timer [911] will be reset at Step S10b9; the exposure to brighter light will have reversed any dark adaptation by the model [96] and such adaptation must now begin again.

In a third example, the comparison engine [99] determines that the luminance is not above the main threshold. The process then moves through the branch beginning "No" to FIG. 10c. At Step S10c1, the processor [96] increments the Scotopic timer [911] to record the length of time for which the luminance of the frames displayed (together with any ambient luminance, if there is a light measurement device [916]) has been below the main threshold.

At Step S10c2, the newly-incremented timer [911] is checked to determine how long the luminance has been below the main threshold. For example, the threshold is 20 minutes and the Scotopic timer [911] indicates that the luminance has been below the main threshold for 25 minutes. The comparison engine [99] sends a signal to the adaptation elements [912, 913, 914] indicating that the "eye" has adapted to darkness to the degree indicated by the threshold used, and the process will move to the branch beginning at "Yes". At Step S10c3 the adaptation elements [912, 913, 914] transmit appropriate signals to the instruction element [915], such that the Acuity element [912] indicates that acuity is low, the Colour element [913] indicates that colour perception is low, and the Focus Area element [914] indicates that the fovea is not more sensitive than the periphery. Accordingly, the instruction element [915] instructs the compression engine [97] to adjust the display data transmitted to the display device [93] to reduce the frame rate, resolution, and/or colour depth, for example by representing colour values using four-bit numbers rather than the maximum eight-bit numbers, which will reduce the number of shades of the colour displayed. These amendments will be applied alongside any other compression methods, but the instructions may also include an instruction to stop using foveal compression if this is in use, so the quality of the display data will be uniform across the frame.

The result is a lower volume of data being transmitted to the display device [93], but any user will not notice any reduction in quality due to the characteristics of dark adaptation: the cones will have reached peak sensitivity and the user is using Scotopic vision, which is characterised by monochrome vision, low responsiveness to small, fast movements, and greatest sensitivity in the area outside the fovea, as represented in the model eye [96].

If the determined luminance has been below the main threshold for a length of time that is lower than the time threshold—for example, the time threshold is 10 minutes and the light level has been below the main threshold for only 5 minutes—the model [96] will not send any instructions to the compression engine [97] to amend the display data or amend it further.

Figure 11:
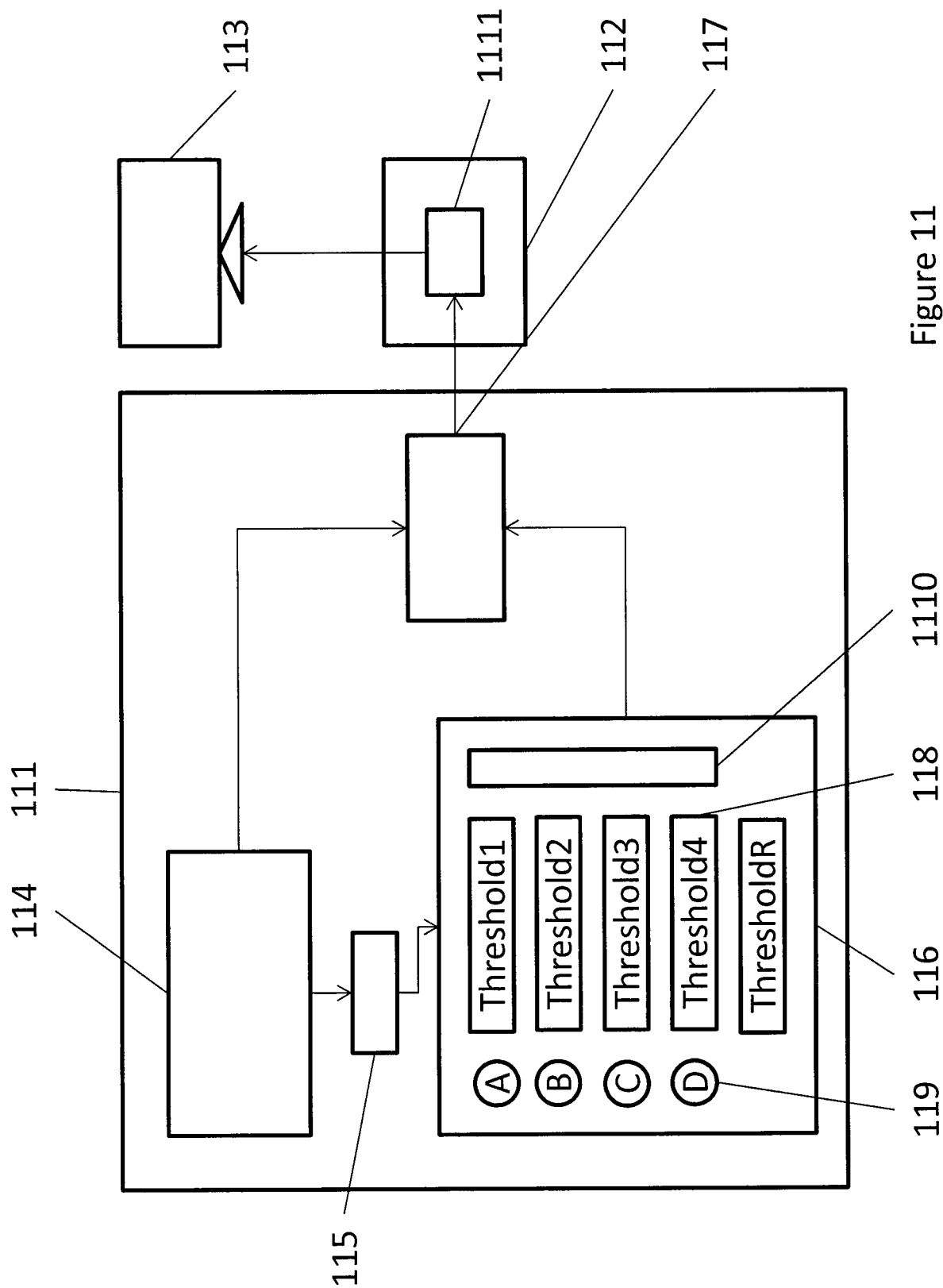
FIG. 11 shows a second detailed example system using a multi-purpose programmable processor.

FIG. 11 shows a second block diagram of a system which does not have adaptation elements [912, 913, 914] as shown in FIG. 9, but is still capable of monitoring light, analysing the resulting information, and adjusting the values of the display data in frames, using a set of thresholds and timers.

As in FIG. 9, there is an application [114] which produces frames of display data. This runs on a processor and the rendering of the display data may be carried out on a GPU. In any case, the application [114] passes frames to an analysis engine [115] such as that described in FIG. 9, and to a compression engine [117]. The analysis engine [115] is in turn connected to a multi-purpose processor [116] which is programmed to store four timers [119] and five thresholds [118], as well has having an integrated memory [1110] which can store the history of various analysis values, such as previous luminances over a predetermined period of time.

The thresholds [118] are values stored in memory. The first four—Threshold1, Threshold2, Threshold3, and Threshold4—are luminance values which, in the examples given herein, are used as follows:

Threshold1 and Threshold3: Determining whether the luminance has dropped to a low level Threshold2 and Threshold4: Determining whether the luminance has risen to a high level The two thresholds in any pair may have the same value or different values. Naturally, this is an example only and in other embodiments the number and arrangement of thresholds may be different.

The fifth threshold [118]—ThresholdR—is a colour value which is used to determine whether the frame is predominantly red in colour.

The timers [119] are used to record the length of time for which the luminance has been above or below particular thresholds. In this example, Timers A, B, and C are associated with Threshold3 to determine the period for which the luminance has been low. Timer D is associated with Threshold4 and used to determine the period for which the luminance has been high. The timers [119] have internal thresholds which are not shown for simplicity but are used to determine whether the values of the timers [119] are sufficiently high to change the behaviour of the system.

As for the thresholds [118], the number and arrangement of the timers [119] is an example only.

As is the case for the model of the eye in FIG. 9, the thresholds and timers allow analysis of the light that will be emitted from the display panel according to parameters which are embodied by these thresholds and timers.

The processor [116] is also connected to the compression engine [117], which adjusts the display data and compresses it, prior to sending it to the display control device [112]. The display control device [112] contains a decompression engine [1111], which decompresses the display data but does not reverse the adjustments to the display data prior to sending it to the display panel [113] for display.

FIGS. 12a-d show further example processes, which will be described with reference to FIG. 11. Any of these methods may be used in any combination. In particular, since the values of FIG. 11's Threshold1 and Threshold3 (for example) may be the same, the associated processes may be used together, and likewise for any other group of two or more thresholds.

Figure 12A:
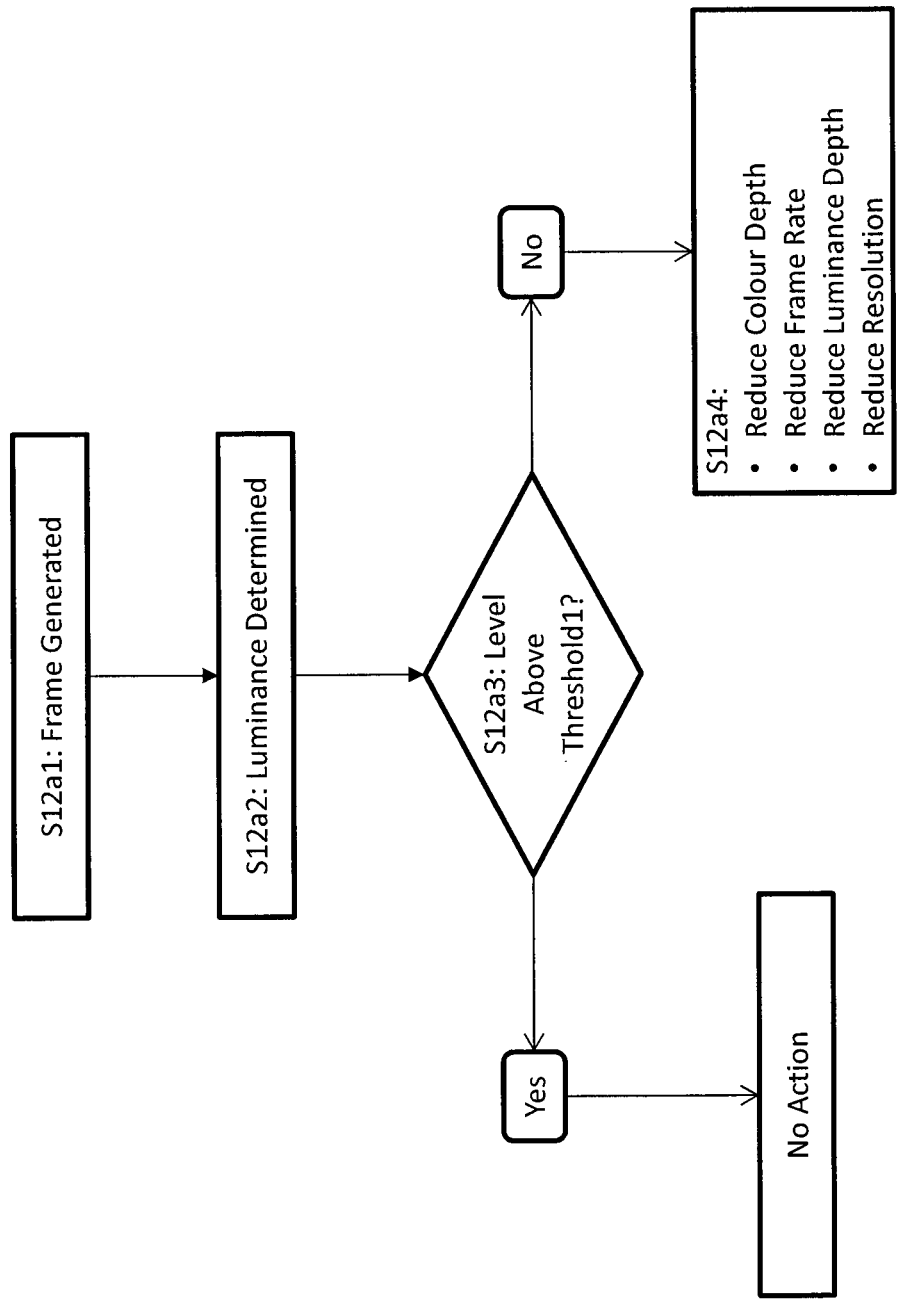
FIG. 12 shows several further detailed example decision-making processes.

FIG. 12a shows a process which will cause the system to react to low luminance regardless of the length of time for which the luminance is low. At Step S12a1 a frame is generated by the application [114] as previously described. When the frame is displayed, light corresponding to the display values in the frame will be emitted from the display panel [113] and may affect the eye of a viewer of the image in the frame.

The frame is then passed to the compression engine [117], and also to the analysis module [115], where it is analysed at Step S12a2 to determine its luminance: i.e. the amount of light that will be emitted by the display panel [113]. As previously mentioned, other information regarding the frame may be analysed at this stage, but it is not relevant to this process.

At Step S12a3, the determined luminance is passed to the processor [116] and compared to the value of Threshold1 [118], which is stored in the processor [116], and the processor [116] determines whether the determined luminance threshold is higher or lower than Threshold1 [118]. If it is higher, the process follows the branch to the left and no action is taken; the frame is not amended unless some other process based on another threshold [118] or other considerations is also being used as elsewhere described.

Otherwise, the process follows the branch to the right and the display data is adjusted. In the system described in FIG. 11, this is carried out in the compression engine [117] and, accordingly, the processor [116] transmits a signal to the compression engine [117] indicating that the light level was lower than Threshold1 [118]. This causes the compression engine [117] to adjust the display data in one or more ways:

Reducing colour depth by reducing the number of bits allocated to the storage and/or transmission of each primary colour;

Reducing the frame rate by sending a feedback signal to the application [114] instructing it to produce fewer frames or dropping some frames until it receives a contradictory signal;

Reducing the luminance depth in either the whole of the frame or part of it, indicated by, for example, feedback from an eye-tracking mechanism, by reducing the number of bits allocated to the storage and/or transmission of the luminance value; and/or Reducing the resolution of the frame by allowing greater corruption of detail during compression Naturally, the example methods given here are only examples and do not limit the scope of possible adjustments and methods.

Figure 12B:
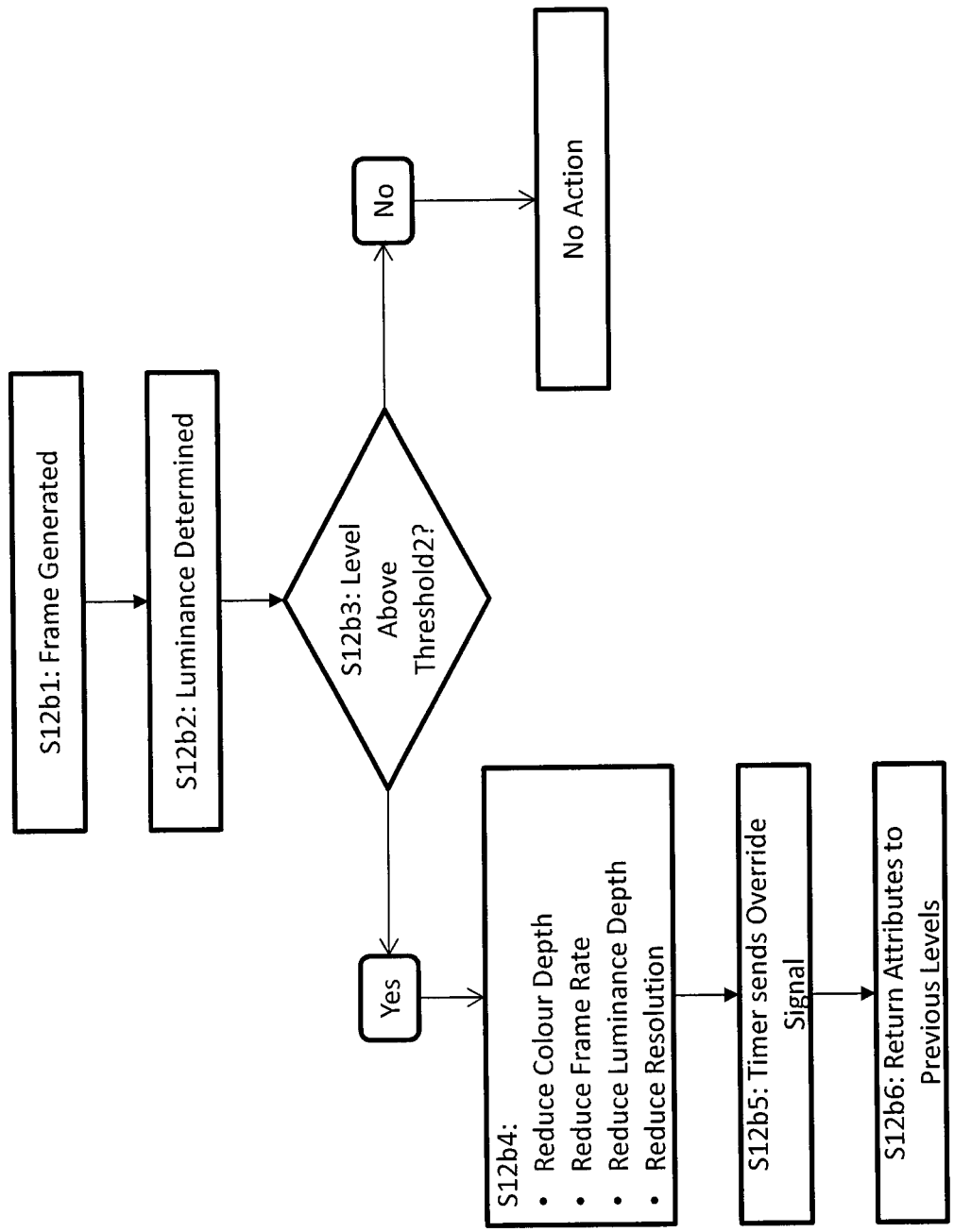

FIG. 12b shows a process which will cause the system to react to a period of high luminance. As previously described, at Step S12b1 a frame is generated by the application [114] and transmitted to the analysis engine [115], which determines its luminance at Step S12b2. It then passes the luminance value to the processor [116], which compares it to the thresholds [118]. For the purposes of this process only one threshold will be considered: Threshold2. This may have the same value as Threshold1 and, indeed, in some embodiments they may be the same threshold, but for this purpose they will be described separately.

At Step S12b3, the processor [116] determines whether the luminance of the frame is above Threshold2. If not, the processor [116] takes no action based on this threshold. If the luminance of the frame is above Threshold2, the processor [116] sends a signal indicating this fact to the compression engine [117]. The compression engine [117] then adjusts the display data in one or more ways:

Reducing colour depth as previously described

Reducing the frame rate as previously described

Reducing the luminance depth as previously described; and/or

Reducing the resolution of the frame as previously described

Threshold2 in this example is analogous to the "dazzle" threshold described in FIG. 10, and therefore the magnitude of these changes should be reduced once time has passed. Accordingly, at Step S12b5 a timer in the compression engine [117] sends an override signal to the compression engine [117]. This will cause the adjusted display values to return to their normal levels at Step S12b6. Naturally, this function may also be performed by a timer in the processor [116].

Figure 12C:
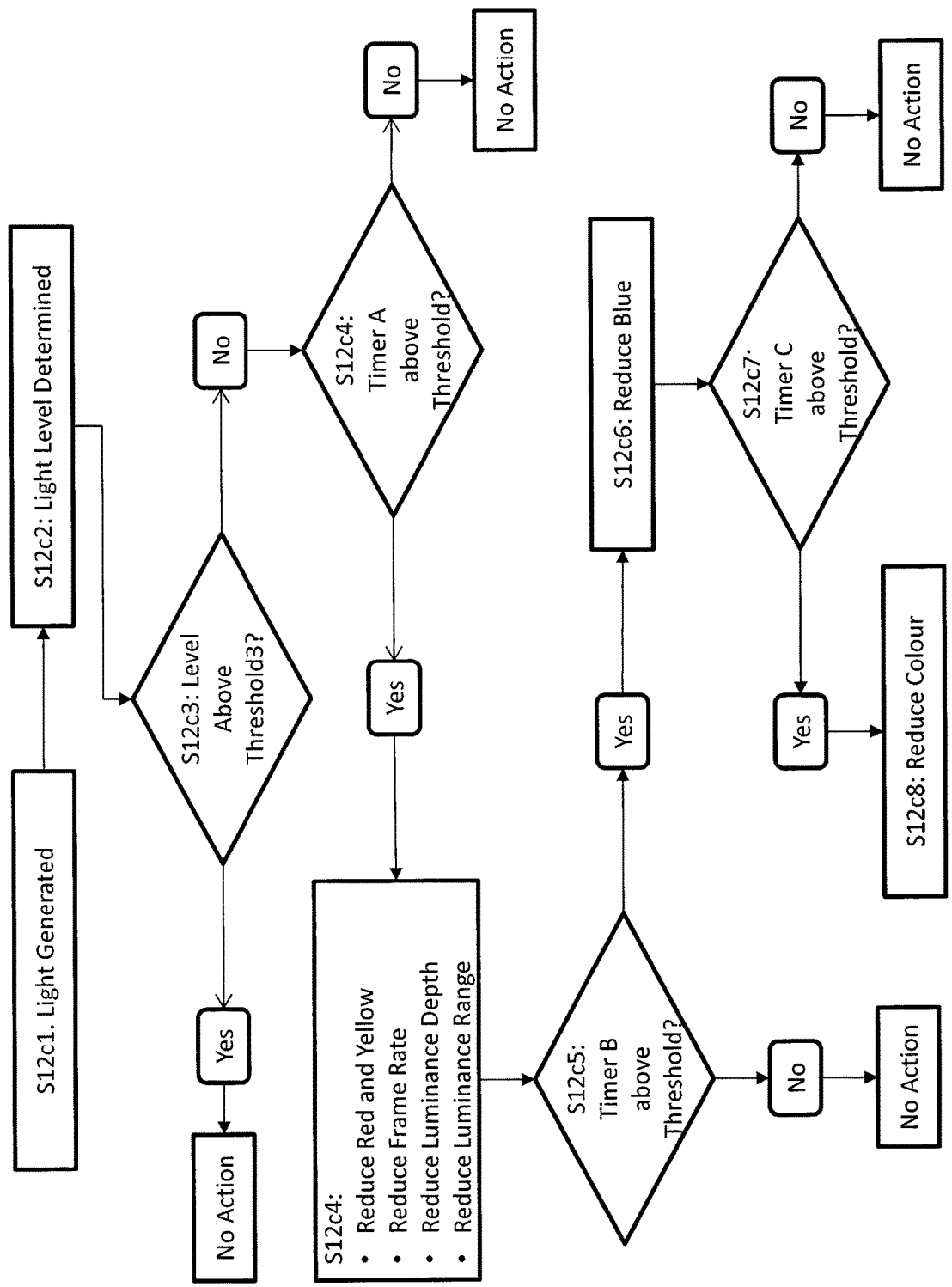

FIG. 12c shows a process which will cause the system to react to a period of low luminance as determined by Timers A, B, and C, as previously mentioned. At Step S1c1 a frame is generated as previously described, and at S12c2 the analysis engine [115] determines its luminance and passes this value to the processor [116].

At Step S12c3, the processor [116] compares the luminance value to Threshold3 [118], as well as the other thresholds [118], which will not be further discussed in this Figure. If the luminance is above Threshold3 [118], the processor [116] takes no further action with respect to that threshold. Otherwise, the value of Timer A [119] is compared to its associated threshold to determine whether the luminance value has been below Threshold3 [118] for a predetermined period of time which has been chosen as being long enough that the system should react.

If not, the timer [119] is incremented according to its functionality, but no other action is taken.

If the timer [119] does have a high enough value, the processor [116] sends a signal to this effect to the compression engine [117], indicating that the luminance is below Threshold3 [118] and Timer A [119] has a high value. As a result, at Step S12c4 the compression engine [117] adjusts display values in the display data of the frame sent to it by the application [114]. These adjustments may include one or more of:

Reducing the levels of red and/or yellow in the frame;

Reducing the frame rate as previously described;

Reducing the luminance depth as previously described;

Reducing the luminance range by limiting the maximum luminance: i.e reducing the difference between the brightest and darkest luminance values in the display data; and/or Reducing the resolution of the display data as previously described The process may end there, or a second timer [119], Timer B, may be used to allow for further adjustments after more time has passed. At Step S12c5 the value of Timer B [119] is compared to its associated threshold to determine if enough time has passed to perform additional adjustments to the display data; this will indicate that the luminance has been below Threshold3 [118] for a second predetermined period of time.

If the value of Timer B [119] is not high enough, it is incremented but no other action is taken. Otherwise, the processor [116] sends a signal to the compression engine [117] to this effect and, as a result, the compression engine [117] reduces the level of blue in the frame at Step S12c6.

Again, the process may end there or a third timer [119], Timer C, may be used to allow further adjustments after a third predetermined period. At Step S12c7 the value of Timer C [119] is compared to its respective threshold and if the appropriate timer has passed the processor sends a further signal to the compression engine [117], causing it to reduce the colour depth generally still further at Step S12c8. This may result in changing the colour profile of the frame to monochrome.

Otherwise, Timer C [119] is incremented and the processor takes no further action.

The timers [119] may increment independently such that as soon as the first frame is below Threshold3 [118] they all begin timing, or they may operate sequentially such that as soon as one timer [119] passes its respective threshold the next begins timing. They may all be reset to zero as soon as the luminance of a frame is above Threshold3 [118], or more than one frame may be required.

Figure 12D:
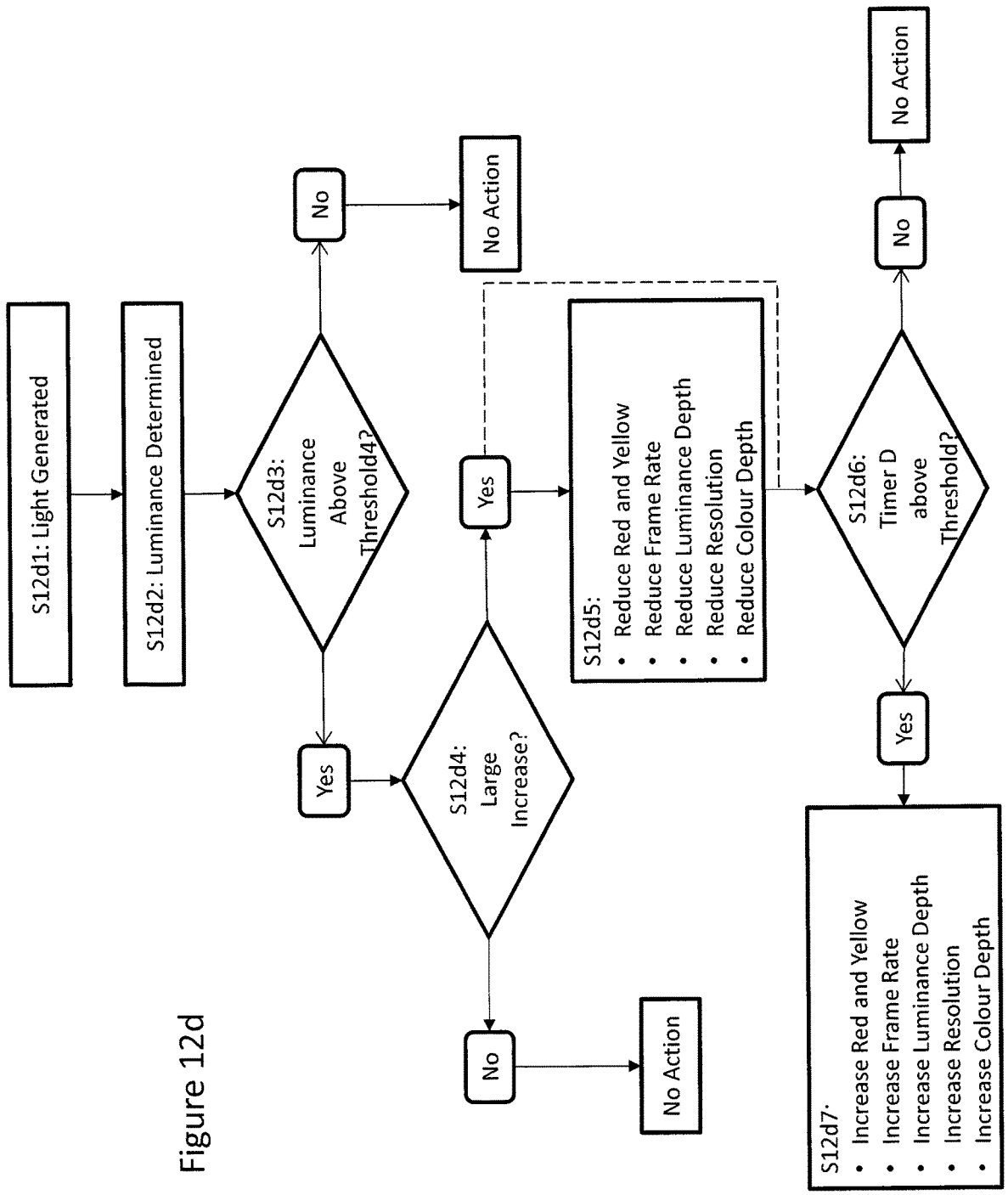

FIG. 12d shows a process which will cause the system to react to a large increase in luminance and a longer period of high luminance as determined by Timer D.

At Step S12d1, a frame is generated by the application [114], as previously described. It is passed to the analysis engine [115], where its luminance is determined at Step S12d2, also as previously described. The resulting value is then passed to the processor [116] and compared to Threshold4 [118] at Step S12d3.

If the luminance is not above Threshold 4 [118], the processor [116] takes no further action and any adjustment or lack of adjustment to the display data being made in the compression engine [117] is unaffected. If the luminance is above Threshold4 [118], the process follows the branch to the left, to Step S12d4.

At Step S12d4, the processor [116] checks a luminance value of a previous frame stored in the memory [1110] to determine the size of any increase in luminance. If there has been no increase or the increase is by less than a predetermined amount, the process follows the branch to the left and no further action is taken as a result of comparison to Threshold4 [118]. However, if the luminance has increased by at least the predetermined amount from a previous luminance to reach a level above Threshold4 [118], the process follows the branch to the right, to Step S12d5.

At Step S12d5, the processor [116] sends a signal to the compression engine, [117] such as those already described, in this case indicating that the luminance has increased by at least a predetermined amount to a level above Threshold4 [118]. This causes the compression engine [117] to adjust display values of the display data comprising the frame. For example:

Reducing the level of the red and yellow components of the display data;

Reducing the frame rate as previously described;

Reducing the luminance depth as previously described;

Reducing the resolution as previously described; and/or

Reducing the colour depth as previously described

The process may stop there, or it may be expanded by the inclusion of a timer [119]: in this embodiment, Timer D is used. This indicates how long the luminance has been above Threshold4 [118] and Timer D [119] may therefore start timing at 0 when the first frame with a higher luminance than Threshold4 [118] is analysed. This expansion is useful because Threshold4 [118] is also analogous to the Dazzle threshold previously described, and therefore it is beneficial to return the display data to its original state after time has passed.

In this case, the determination at Step 12d4 may still involve checking a value stored in the internal memory [1110] of the processor [116], but in this case the value may be an indication of whether when the luminance first passed Threshold4 [118] it had increased by a predetermined amount. In this case, the process still follows the branch to the right, but since presumably Step S12d5 will have been carried out when the luminance first passed Threshold4 [118], as previously described, this step could be omitted and the process could instead follow the dashed line directly to Step S12d6.

At Step S12d6, the processor [116] checks the value of Timer D [119] to determine how long the luminance has been above Threshold4 [118]. If the value of the timer [119] is below the threshold, not enough time has passed and the process follows the branch to the right: no further action is taken and the compression engine [117] continues to make the adjustments indicated at Step S12d5.

If the appropriate length of time has passed, the process follows the branch to the left and at Step S12d7 the processor [116] sends a signal to the compression engine [117] indicating that it should amend its behaviour to:

Increase the levels of the red and yellow components of the display data;

Increase the frame rate;

Increase the luminance depth;

Increase the resolution; and/or

Increase the colour depth

Thus either partially or fully reversing the effects of the initial signal sent at Step S12d5.

A similar effect may be achieved by the processor [116] simply sending a signal to the compression engine [117] to stop making the adjustments indicated at Step S12d5 after a predetermined period of time, or the compression engine [117] having an internal timer that sends an override signal after a predetermined period of time in a similar way to that described in FIG. 12b.

Figure 12E:
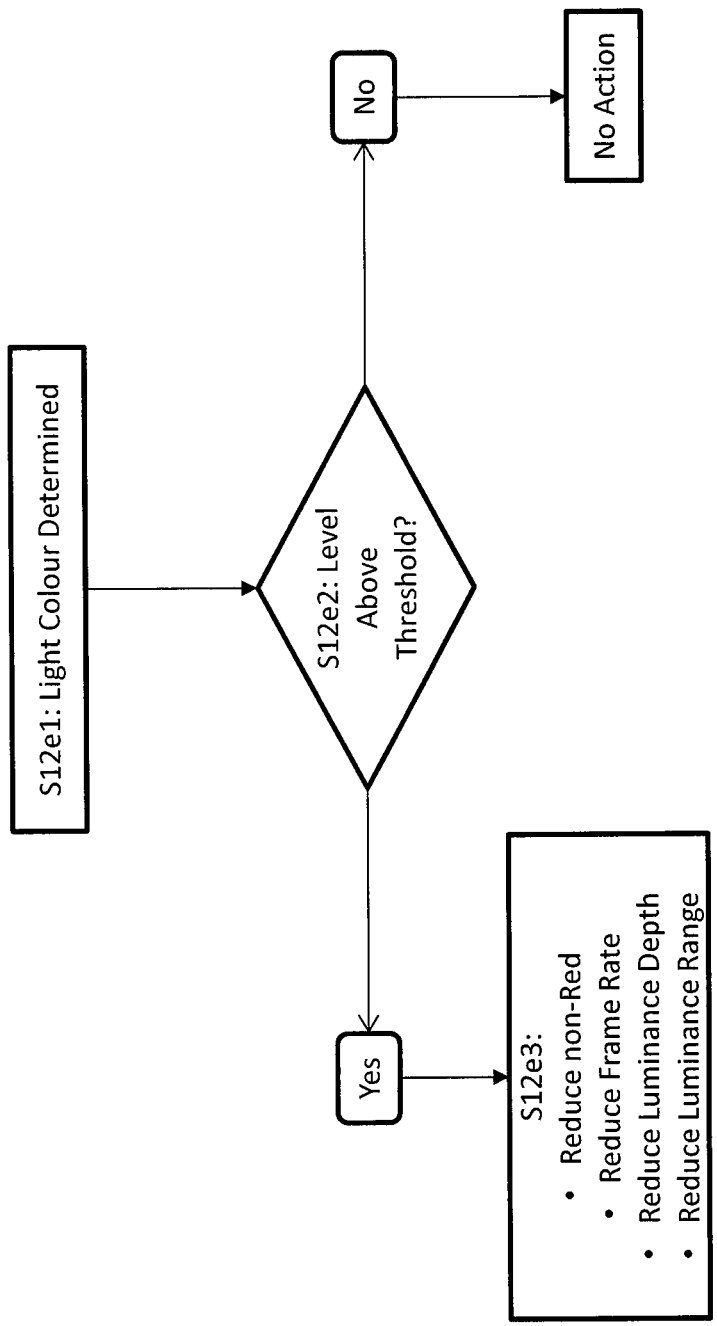

FIG. 12e shows a final process by which the behaviour of the system is adjusted when the frame is predominantly red in colour and will therefore cause the display panel to emit red light.

At Step S12e1, the level of red in the frame and therefore the light that will be emitted is determined in the analysis engine [115]. This may be an absolute value or one relative to other colours present in the frame. This value is then transmitted to the processor [116], where it is compared to ThresholdR [118] at Step S12e2. If the level of red in the frame is not above ThresholdR [118], no action is taken as a result of the colour of the light, though luminance may cause the processor [116] to signal the compression engine [117] as previously described.

Otherwise, the process follows the branch to the left, to Step S12e3 and the processor [116] sends a signal to the compression engine [117] indicating that it should adjust the display values in the display data of the frame by, for example:

Reducing the levels of non-red colour components in the frame;
Reducing the frame rate as previously described;
Reducing the luminance depth as previously described; and/or
Reducing the luminance range as previously described.

Any and all of these methods may be used together and the signals sent may cancel one another out in any appropriate way according to the embodiment.

Figure 13:
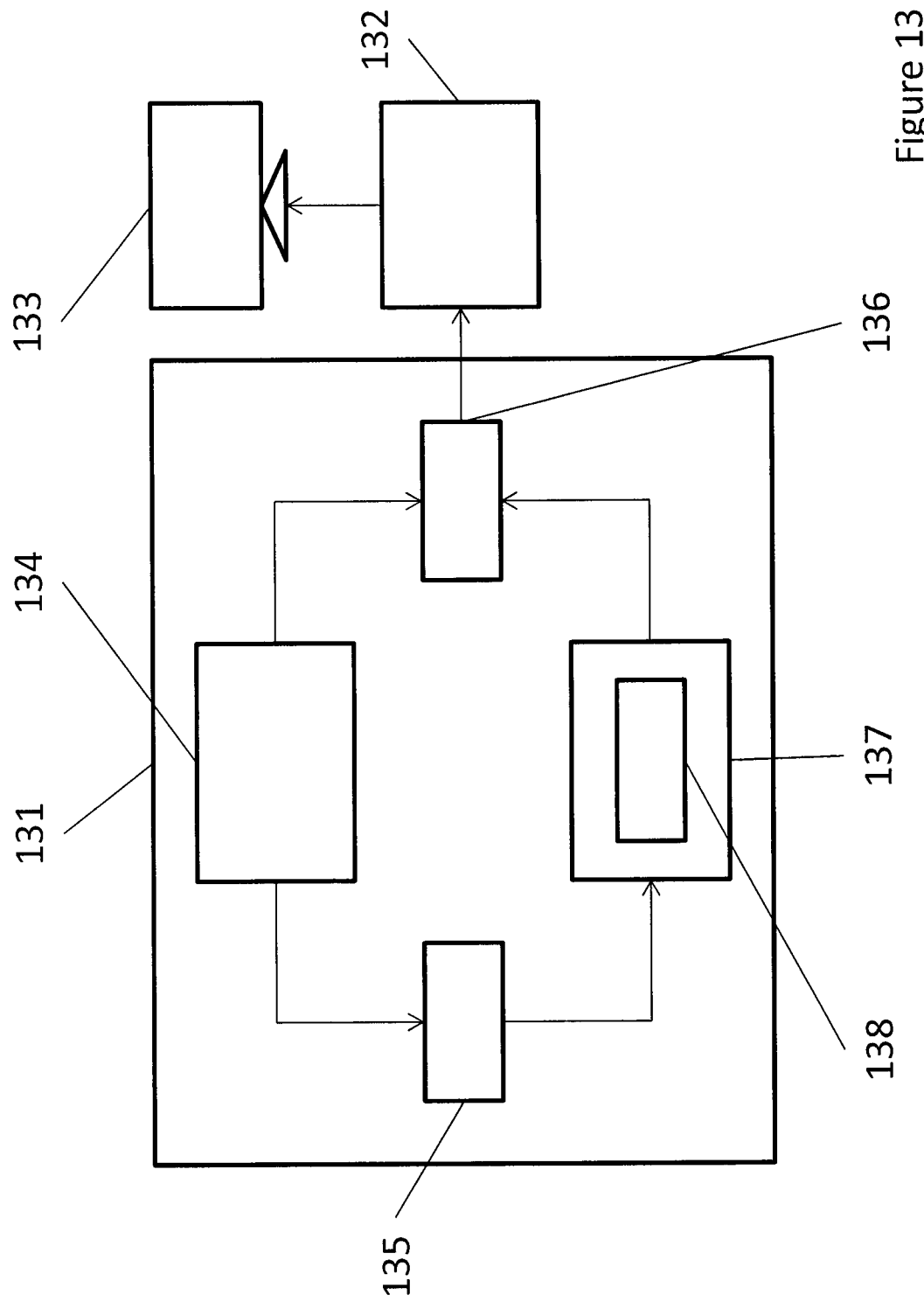
FIG. 13 shows an example system with a single threshold.

FIG. 13 shows a system comprising a host [131], a display control device [132], and a display device [133] similar to those described in FIGS. 9 and 11, but using a very simple threshold comparison engine [137] which includes only one threshold [138]. This threshold is still a parameter which is used in the analysis of the light which will be emitted by the display device [133].

Accordingly, inside the host [131], the application [134] which produces frames is connected to an analysis engine [135], which analyses frames to determine their luminance as previously described. The analysis engine [135] is in turn connected to the comparison engine [137].

The application [134] also sends frames to a compression engine [136] for compression prior to transmission to the display control device [132]. The comparison engine [137] is also connected to the compression engine [136] to enable it to transmit instructions which will control the compression carried out by the compression engine [136].

As in the systems described in FIGS. 9 and 11, the compressed data is transmitted to the display control device [132], where it is decompressed prior to display on the display device [133].

Figure 14:
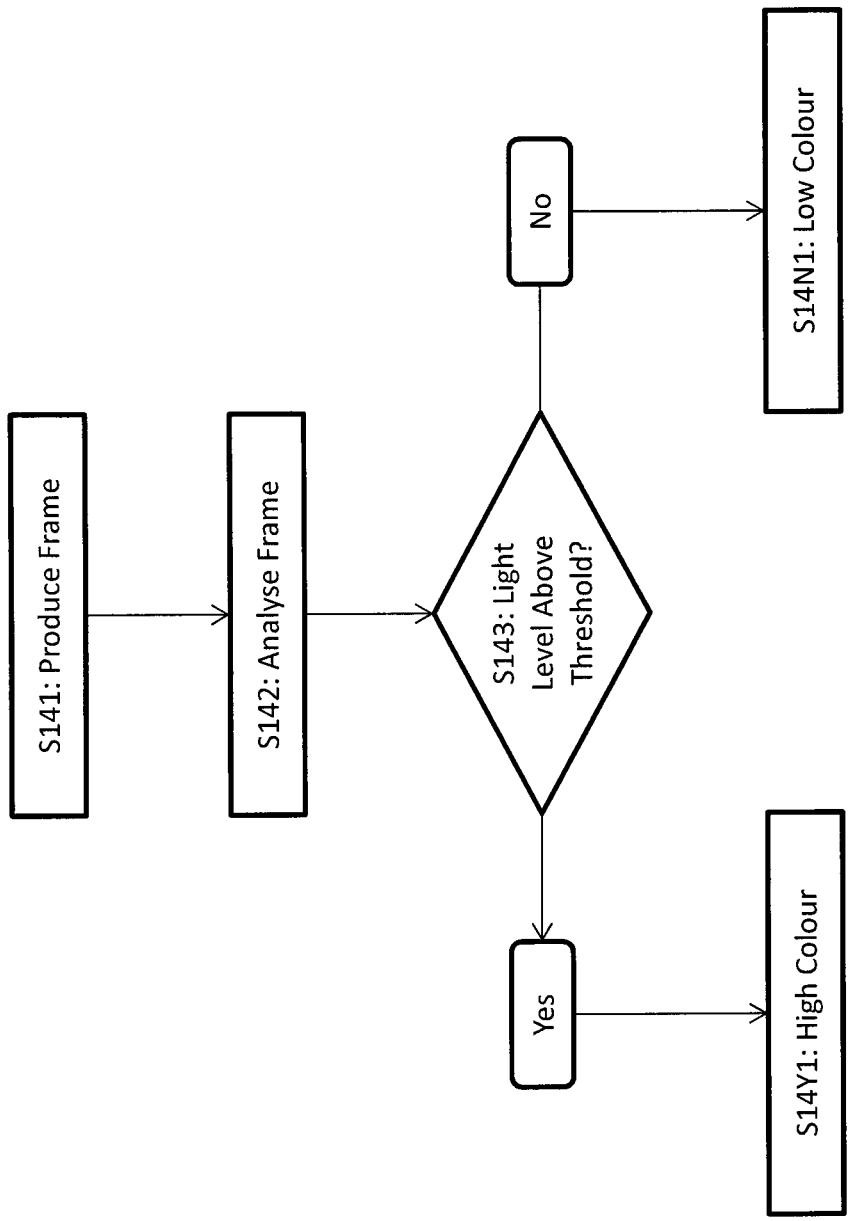
FIG. 14 shows the decision-making process associated with the embodiment in FIG. 11.

FIG. 14 shows the process followed in this simpler embodiment of the system.

At Step S141, the application [134] produces a frame of display data, as previously described. It is transmitted to the compression engine [136] for compression, and also to the analysis engine [135]. At Step S142, the frame is analysed in the analysis engine [135] to determine its luminance. This is carried out in the same way as the analysis described in FIG. 10, but in this embodiment the colour of the frame is not determined as it will not be required by the comparison engine [137]. It then forwards the results of the analysis to the model [137].

At Step S143, the luminance determined at Step S142 is compared to the threshold value [138] stored in the comparison engine [137]. In this embodiment, this is a single luminance value, and if the determined luminance of the frame is higher than the threshold [138] the process follows the branch to the left, beginning at "Yes", otherwise it follows the branch to the right, beginning at "No".

At Step S14Y1, the frame has been determined to be brighter than the threshold [138] stored in the comparison engine [137]. In this embodiment, the model [137] therefore instructs the compression engine [136] that it should retain the colour balance and resolution of the original display data.

In contrast, at Step S14N1, the frame has been determined to be dimmer than the threshold [138]. As a result, in this embodiment the comparison engine [137] transmits an instruction to the compression engine [136] that it should lower the colour depth transmitted to the display control device [132]. Because this means that frames are represented by less information, the volume of data transmitted to the display control device [132] will be lower. The lost data will not be restored upon decompression, resulting in fewer shades of colour being displayed in the final image.

Naturally, a similar crude model could be used to control the behaviour of the host [131] with respect to any of the other properties of the display data, such as resolution, frame rate, etc., and it may also be used in reverse to detect a light level that is determined to be over-intense, such that the user's eyes will not adjust sufficiently to see details even with time. Finally, a model or similar mechanism may be of a level of complexity between the levels shown here. For example, there may be a single threshold with one or two fixed timers, or there may be multiple thresholds without timers.

The methods of the invention have been described with respect to differences in luminance across time. However, a method based on the invention may also be applied across space such that drastically-different levels of luminance within a frame may affect the encoding of that frame. An example is shown in FIG. 15.

Figure 15:
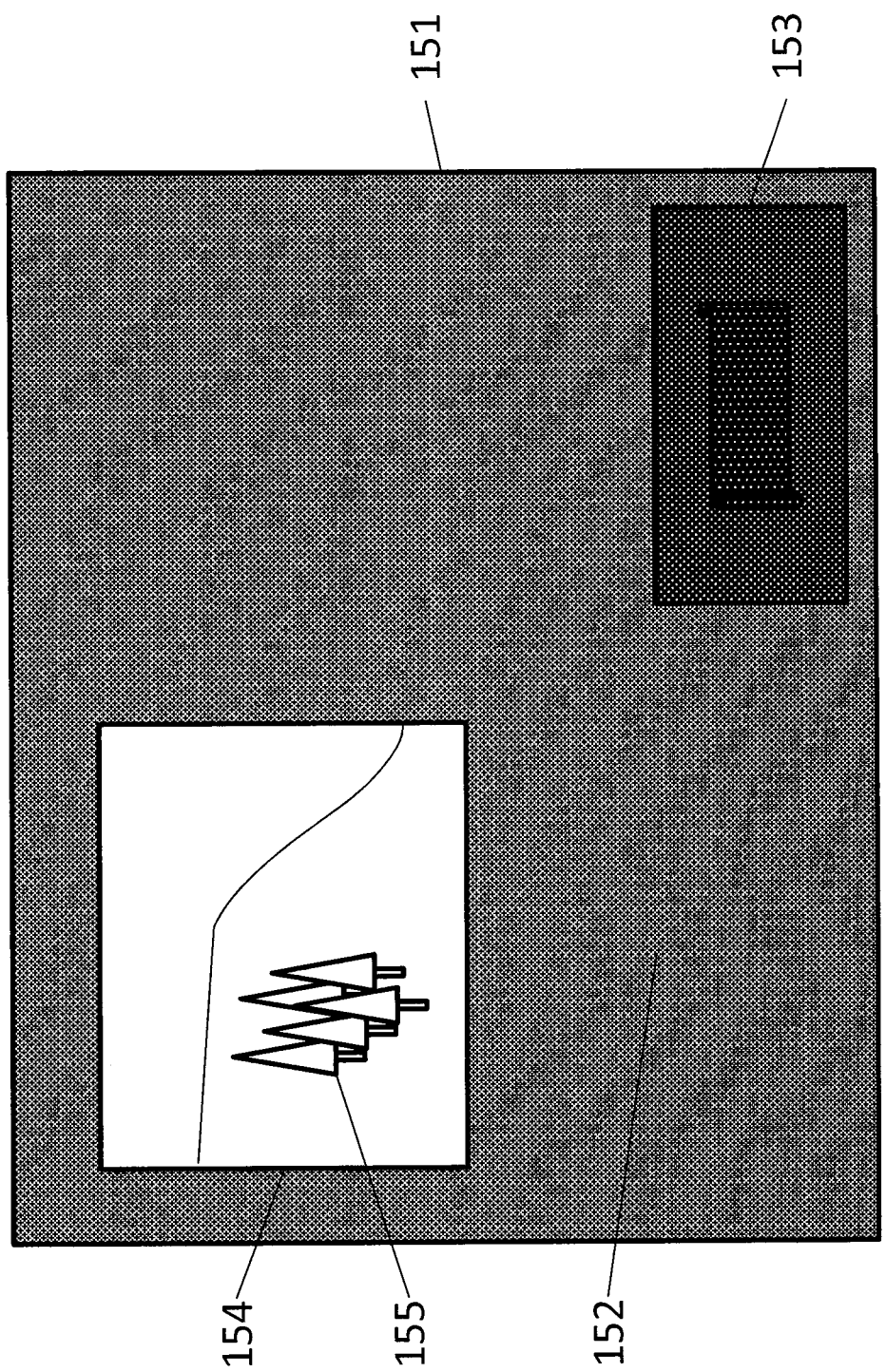
FIG. 15 shows a frame with areas of contrasting luminance.

FIG. 15 shows a frame [151] which mostly consists of an area of low luminance [152] featuring some detailed objects [153]. There is also an area of high luminance [154] which likewise features some detailed objects [155]. Overall, this frame [151] might have a low average luminance. However, in this case it would be appropriate to apply the methods of the invention to the two parts [152, 154] separately, treating the high-luminance area [154] as requiring high colour depth, good resolution, fast movement, etc. while the low-luminance area [152] can be encoded with low colour depth, resolution, and movement.

The details [155] in the high-luminance area [154] would therefore be prioritised over the details [153] in the low-luminance area [153].

Not only could the two areas be differently encoded, but an analysis engine such as those described above could carry out analysis on the high-luminance area only, as long as there is a significant difference between the two areas [152, 154]—for example, the luminance of the low-luminance area [152] is less than 50% of the luminance of the high-luminance area [154].

These methods improve the coding of display data according to assumptions about the perceptions of a viewer, in order to reduce the volume of data being transmitted across a limited-bandwidth connection. This will allow the system to transmit data more quickly and with less risk of data loss or interference.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and engines/modules which are described as separate may be combined into single engines/modules and vice versa. Functionality of the engines or other modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method for adapting display data forming an image for display on a display screen to a viewer, the method comprising:
   monitoring, over time, light that may affect an eye of the viewer of the image;
   analysing information regarding the monitored light based on one or more predetermined parameters by comparing a level of brightness of the monitored light to one or more brightness thresholds, wherein the one or more brightness thresholds includes a first brightness threshold and a second brightness threshold;
   adjusting at least one display value of at least some of the display data based on the analysis of the information regarding the monitored light by, when the level of brightness is below the first brightness threshold, performing one or more of:
      reducing colour depth of the display data;
      reducing a frame rate of the display data;
      reducing a luminance depth of the display data by a first amount; or
      decreasing a resolution of at least a portion of the display data;
   sending the adjusted display data for display on the display screen; and
   subsequent to sending the adjusted display data, when the level of brightness of the light is above the second brightness threshold, performing, for a predetermined period of time after it is determined that the level of brightness has increased to a brightness level above the second brightness threshold, one or more of:
      reducing the colour depth of the adjusted display data;
      reducing the frame rate of the adjusted display data;
      reducing the luminance depth of the adjusted display data by the first amount; or
      decreasing the resolution of at least the portion of the adjusted display data.

2. The method according to claim 1, wherein the one or more brightness thresholds includes a third brightness threshold, and adjusting the at least one display value comprises, when the level of brightness remains below the third brightness threshold for a first predetermined period of time, performing one or more of:
   reducing values of red and/or yellow colour components of the display data;
   reducing the frame rate of the display data;
   reducing the luminance depth of the display data by a second amount, being higher than the first amount; or
   decreasing a luminance range of at least a portion of the display data.

3. The method according to claim 2, wherein reducing the luminance depth comprises relatively reducing a first luminance depth of a first portion of the display data forming part of the image compared to a second luminance depth of a second portion of the display data forming a different part of the image.

4. The method according to claim 3, further comprising receiving feedback from an eye tracking sensor as to which part of the image is being focused on by the viewer, and relatively reducing the luminance depth of the part of the image being focused on by the viewer and relatively increasing the luminance depth of the different part of the image which is being viewed using peripheral vision of the viewer.

5. The method according to claim 2, wherein the one or more brightness thresholds includes a fourth brightness threshold, and the method further comprises comparing the level of brightness with recent previous levels of brightness and adjusting the at least one display value comprises, when the level of brightness has increased by at least a predetermined amount from the recent previous levels of brightness to the brightness level above the fourth brightness threshold, performing, for a third period of time, one or more of:
   reducing the values of red and/or yellow colour components of the display data to a reduced amount;
   reducing the frame rate of the display data to a reduced frame rate;
   reducing the luminance depth of the display data to a reduced luminance depth;
   reducing the resolution of at least the portion of the display data to a reduced resolution; or
   reducing the colour depth of the display data.

6. The method according to claim 5, wherein adjusting the at least one display value comprises performing, when the level of brightness remains above the fourth brightness threshold for a fourth period of time, one or more of:
   increasing the values of red and/or yellow colour components of the display data from the reduced amount;
   increasing the frame rate of the display data from the reduced frame rate;
   increasing the luminance depth of the display data from the reduced luminance depth;
   increasing the resolution of at least the portion of the display data from the reduced resolution; or
   increasing the colour depth of the display data.

7. The method according to claim 2, wherein adjusting the at least one display value comprises reducing values of blue and/or green colour components of the display data when the level of brightness remains below the third brightness threshold for a second predetermined period of time, or
   wherein adjusting the at least one display value comprises removing all colour data of the display data when the level of brightness remains below the third brightness threshold for a third predetermined period of time.

8. A method for adapting display data forming an image for display on a display screen to a viewer, the method comprising:
   monitoring, over time, light that may affect an eye of the viewer of the image;
   analysing information regarding the monitored light based on one or more predetermined parameters by comparing a level of brightness of the monitored light to one or more brightness thresholds, wherein the one or more brightness thresholds includes a first brightness threshold and a second brightness threshold;
   adjusting at least one display value of at least some of the display data based on the analysis of the information regarding the monitored light, wherein adjusting the at least one display value comprises, when the level of brightness is below the first brightness threshold, removing one or more elements of the image and performing one or more of:
      reducing colour depth of the display data;
      reducing a frame rate of the display data;
      reducing a luminance depth of the display data by a first amount; or
      decreasing a resolution of at least a portion of the display data; and
   sending the adjusted display data for display on the display screen; and
   subsequent to sending the adjusted display data, when the level of brightness has increased above the second brightness threshold, further performing the one or more of:
      reducing the colour depth of the adjusted display data;
      reducing the frame rate of the adjusted display data;
      reducing the luminance depth of the adjusted display data by the first amount; or decreasing the resolution of the at least the portion of the adjusted display data.

9. The method according to claim 8, wherein adjusting the luminance depth of the display data comprises relatively reducing the luminance depth of a first portion of the image in the display data as compared to a second portion of the image.

10. The method according to claim 1, wherein the one or more predetermined parameters are based on a predetermined model of reactions of a human eye to light or changes in the light.

11. The method according to claim 1, wherein monitoring the light comprises monitoring light emitted or to be emitted by the display screen when the image is displayed thereon, wherein monitoring the light comprises determining a luminance of the display data being displayed or to be displayed on the display screen.

12. The method according to claim 1, wherein the one or more predetermined parameters includes one or more colour thresholds and monitoring the light comprises monitoring relative levels of different colour components in the monitored light.

13. The method according to claim 1, further comprising compressing the adjusted display data prior to sending the adjusted display data for display on the display screen.

14. The method of claim 1, wherein adjusting the at least one display value of the at least some of the display data based on the analysis of the information regarding the monitored light comprises adjusting a first portion of the display data to have a higher colour depth, a higher resolution, or a faster movement over a second portion of the display data.

15. A system comprising:
a non-transitory memory storing instructions; and
one or more hardware processors coupled to the non-transitory memory and configured to execute the instructions from the non-transitory memory to cause the system to perform operations comprising:
monitoring, over time, light that may affect an eye of a viewer of an image associated with display data for display on a display screen to the viewer;
analysing information regarding the monitored light based on one or more predetermined parameters by comparing a level of brightness of the monitored light to one or more brightness thresholds, wherein the one or more brightness thresholds includes a first brightness threshold and a second brightness threshold;
adjusting at least one display value of at least some of the display data based on the analysis of the information regarding the monitored light, wherein adjusting the at least one display value comprises, when the level of brightness is below the first brightness threshold, removing one or more elements of the image and performing one or more of:
reducing colour depth of the display data;
reducing a frame rate of the display data;
reducing a luminance depth of the display data by a first amount; or
decreasing a resolution of at least a portion of the display data; and
sending the adjusted display data for display on the display screen; and
subsequent to sending the adjusted display data, when the level of brightness has increased above the second brightness threshold, further performing the one or more of:
reducing the colour depth of the adjusted display data;
reducing the frame rate of the adjusted display data;
reducing the luminance depth of the adjusted display data by the first amount; or
decreasing the resolution of the at least the portion of the adjusted display data.

16. The system according to claim 15 and an augmented reality device or virtual reality headset comprising the display screen.

17. A method for adapting display data forming an image for display on a display screen to a viewer, the method comprising:
monitoring, over time, light that may affect an eye of the viewer of the image;
analysing information regarding the monitored light based on one or more predetermined parameters;
adjusting at least one display value of at least some of the display data based on the analysis of the information regarding the monitored light; and
sending the adjusted display data for display on the display,
wherein the one or more predetermined parameters includes one or more colour thresholds, wherein monitoring the light comprises determining a level of red colour component in the monitored light relative to other colour components in the monitored light, and wherein adjusting the at least one display value comprises, when the determined level of red colour component in the monitored light relative to other colour components in the light is above a first red colour threshold, performing one or more of:
reducing values of non-red colour component data of the display data relative to values of red colour component data in the display data;
increasing a frame rate of the display data;
increasing a luminance depth of at least a portion of the display data; or
decreasing colour depth of the display data.

* * * * *